United States Patent
Alarid et al.

(10) Patent No.: US 8,784,733 B2
(45) Date of Patent: Jul. 22, 2014

(54) CHLORINE DIOXIDE GENERATION SYSTEMS AND METHODS

(75) Inventors: Vince G. Alarid, Gainesville, FL (US); Edward M. Martens, Loveland, CO (US); Bobby J. Owings, Seale, AL (US); Glenn W. Holden, Spring, TX (US)

(73) Assignee: Evoqua Water Technologies LLC, Alpharetta, GA (US)

( * ) Notice: Subject to any disclaimer, the term of this patent is extended or adjusted under 35 U.S.C. 154(b) by 553 days.

(21) Appl. No.: 13/055,010

(22) PCT Filed: Jul. 27, 2009

(86) PCT No.: PCT/US2009/051813
§ 371 (c)(1),
(2), (4) Date: Jan. 20, 2011

(87) PCT Pub. No.: WO2010/011989
PCT Pub. Date: Jan. 28, 2010

(65) Prior Publication Data
US 2011/0129388 A1    Jun. 2, 2011

Related U.S. Application Data

(60) Provisional application No. 61/083,753, filed on Jul. 25, 2008, provisional application No. 61/182,615, filed on May 29, 2009.

(51) Int. Cl.
*B08B 17/00* (2006.01)
*A61L 9/00* (2006.01)
*G01D 11/26* (2006.01)
*A61L 2/00* (2006.01)

(52) U.S. Cl.
USPC .......... 422/36; 422/1; 422/6; 422/28; 422/32; 422/105; 422/119; 422/292; 422/305; 204/268; 204/194

(58) Field of Classification Search
USPC ............... 422/1, 6, 28, 32, 36, 105, 119, 292, 422/305; 204/268, 194; 252/187 R
See application file for complete search history.

(56) References Cited

U.S. PATENT DOCUMENTS 3,816,077 A    6/1974  Fuller et al.
4,013,761 A    3/1977  Ward et al.
(Continued)

FOREIGN PATENT DOCUMENTS

FR    2855167 B1    6/2006
JP    2000-185908 A    7/2000
WO    0168518 A3    12/2001

OTHER PUBLICATIONS

USFilter, Wallance & Tiernan Products Brochure, LVN-2000, Liquid Chemical Feed System. 2002.

*Primary Examiner* — Monzer R Chorbaji

(57) ABSTRACT

Chlorine dioxide generation systems and methods are disclosed. One or more reactants, such as sodium hypochlorite, may be electrolytically generated on-site for delivery to a reaction column. Low concentration reactants may be used to generate chlorine dioxide as part of a mixed oxy-chloro product stream containing free available chlorine. In at least one embodiment, an optical analyzer may be positioned along a reactant feed line to measure a concentration of reactant supplied to a reaction column. A controller may adjust a flow rate of the reactant in response to information provided by the optical analyzer. The controller may also perform pH control within the system. In some embodiments, the chlorine dioxide generator may be incorporated in an all-liquid water disinfection system.

21 Claims, 12 Drawing Sheets

(56) References Cited

U.S. PATENT DOCUMENTS

| | | | |
|---|---|---|---|
| 4,118,307 A * | 10/1978 | LaBarre | 204/268 |
| 4,234,446 A | 11/1980 | Ramras | |
| 4,247,531 A | 1/1981 | Hicks | |
| 4,251,224 A | 2/1981 | Cowley et al. | |
| 4,251,503 A | 2/1981 | Swindells et al. | |
| 4,311,485 A | 1/1982 | Saltzman et al. | |
| 4,534,952 A | 8/1985 | Rapson et al. | |
| 4,590,057 A | 5/1986 | Hicks | |
| 4,803,039 A | 2/1989 | Impink, Jr. et al. | |
| 5,009,875 A * | 4/1991 | Kelley et al. | 423/477 |
| 5,204,081 A | 4/1993 | Mason et al. | |
| 5,227,306 A | 7/1993 | Eltomi et al. | |
| 5,382,520 A | 1/1995 | Jenson et al. | |
| 5,780,737 A | 7/1998 | Wible et al. | |
| 6,468,479 B1 | 10/2002 | Mason et al. | |
| 6,620,380 B2 | 9/2003 | Thomas et al. | |
| 6,790,427 B2 | 9/2004 | Charles et al. | |
| 6,972,121 B2 | 12/2005 | Pu et al. | |
| 7,452,511 B2 | 11/2008 | Schmitz et al. | |
| 7,504,074 B2 | 3/2009 | Martens et al. | |
| 2003/0229422 A1 * | 12/2003 | Martens et al. | 700/266 |
| 2006/0096930 A1 | 5/2006 | Beardwood | |
| 2007/0152187 A1 | 7/2007 | Truchlaeft | |
| 2009/0263313 A1 | 10/2009 | Martens et al. | |
| 2011/0052480 A1 | 3/2011 | Martens et al. | |

\* cited by examiner

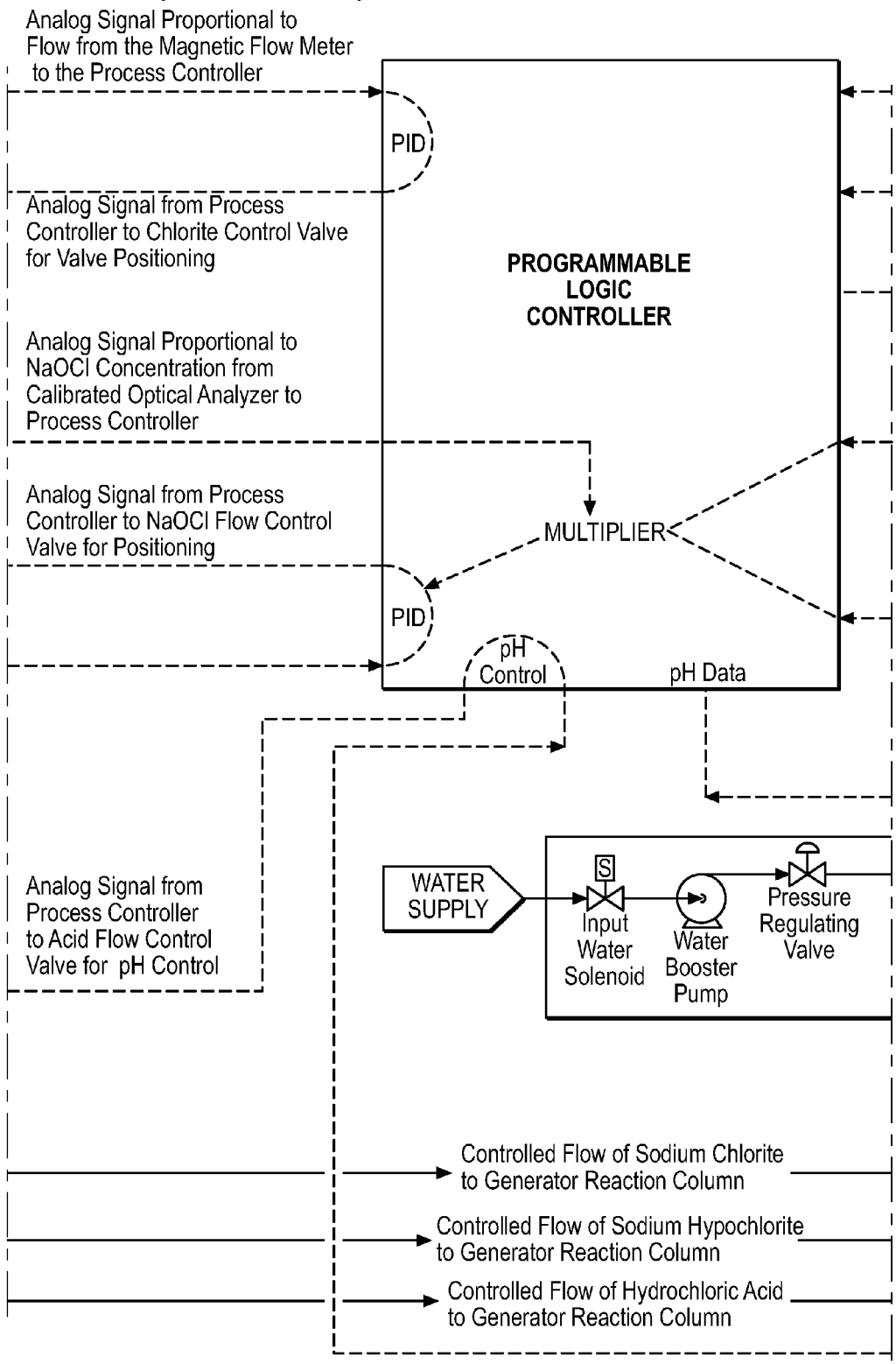

⑧ Lab Ball Valve
⑨ Teflon Check Valve
⑩ Check Valve (Kynar)
⑪ Reaction Columns
⑫ Ejector

- ⑥ TU Ball Check Valve
- ⑦ TU Ball Valve
- ⑧ Lab Ball Valve
- ⑳ Ultrasonic Level Transmitter
- ㉑ Safety Float
- ㉒ FRP Batch Tank
- ㉓ ClO2 Solution Pump
- ㉔ Chlorine Dioxide Analyzer
- ㉕ ClO2 Solution Rotometer
- ㉖ ClO2 Solution Flow Control Valve

CHLORINE DIOXIDE GENERATION SYSTEMS AND METHODS

FIELD OF THE DISCLOSURE

One or more embodiments find applicability in the field of chlorine dioxide generation.

BACKGROUND

As disclosed in U.S. Pat. No. 7,504,074 to Martens et al., commonly assigned with the instant application, many conventional approaches to chlorine dioxide generation generally involve a vapor-phase reaction of sodium chlorite, sodium hypochlorite and hydrochloric acid. Chlorine gas is produced in-situ as a chemical intermediate in the reaction scheme. Commercially available precursor chemicals, typically including 12.5% sodium hypochlorite, are pulled into a reaction column via a vacuum eductor where they react to produce concentrated chlorine dioxide at high conversion efficiencies.

SUMMARY

Aspects relate generally to systems and methods for generating chlorine dioxide.

In accordance with one or more embodiments, a chlorine dioxide generation system is disclosed comprising a reactor column, a source of sodium hypochlorite reactant at a concentration of less than about 6% by weight fluidly connected to the reactor column, a source of hydrochloric acid reactant fluidly connected to the reactor column, a source of sodium chlorite reactant fluidly connected to the reactor column, a pH sensor configured to detect a pH condition associated with the reactor column, a controller, in communication with the pH sensor, configured to adjust a flow rate of at least one reactant to the reactor column in response to a detected pH condition deviating from a pH range preselected to favor formation of chlorine dioxide in a mixed oxy-chloro product stream, and a mixed oxy-chloro product stream outlet.

In some embodiments, the system may further comprise a vacuum eductor adapted to facilitate delivery of at least one reactant to the reactor column. The system may still further comprise a first sensor configured to detect a flow rate of at least one reactant delivered to the reactor column. The system may further comprise a second sensor configured to detect a concentration of chlorine dioxide downstream of the mixed oxy-chloro product stream outlet. In at least one embodiment, the controller is in communication with the first and second sensors and configured to determine a theoretical chlorine dioxide production rate based on the flow rate of the at least one reactant detected by the first sensor, determine an actual chlorine dioxide production rate based on the chlorine dioxide concentration detected by the second sensor, monitor a system efficiency based on the theoretical chlorine dioxide production rate and the actual chlorine dioxide production rate, and adjust flow of at least one reactant to the reaction column based on the system efficiency. A flow rate of at least one reactant is adjusted in response to the system efficiency being deficient with respect to a predetermined limit.

In some embodiments, the system may further comprise a premixing chamber positioned upstream of the reactor column and fluidly connected to the source of hydrochloric acid and the source of sodium hypochlorite. The pH sensor may be positioned downstream of the premixing chamber and upstream of the reactor column. In at least one embodiment, the controller is configured to regulate flow of the hydrochloric acid to the premixing chamber to establish a pH level within the predetermined pH range.

In some embodiments, the system may further comprise an optical analyzer configured to detect a concentration of sodium hypochlorite reactant introduced to the reactor column. In at least one embodiment, the system may have a sodium chlorite molar conversion efficiency of at least about 95%. In some embodiments, sodium hypochlorite reactant is at a concentration of about 0.8%.

In accordance with one or more embodiments, a chlorine dioxide generation system may comprise an electrolytic sodium hypochlorite generator constructed and arranged to produce sodium hypochlorite at a concentration of about 0.2% to about 6% by weight, and a reactor column having a first inlet in fluid communication with at least one of an outlet of the electrolytic sodium hypochlorite generator, a source of hydrochloric acid, and a source of sodium chlorite.

In some embodiments, the system may further comprise a controller configured to regulate at least one operational parameter of the chlorine dioxide generation system. The system may still further comprise a pH sensor in communication with the controller configured to detect a pH condition of a process stream within the reactor column. In some embodiments, the system may further comprise an optical analyzer in communication with the controller configured to monitor a concentration of chlorine dioxide in a product stream exiting the reactor column.

In accordance with one or more embodiments, a method of producing chlorine dioxide may comprise electrolytically generating sodium hypochlorite at a concentration of about 0.2 to about 6% by weight, mixing the electrolytically generated sodium hypochlorite with hydrochloric acid to generate a first reaction product, and introducing the first reaction product to sodium chlorite to form a product stream comprising chlorine dioxide and free available chlorine in a desired faun.

In some embodiments, the product stream may comprise about 5% to about 21% by weight free available chlorine in the desired form. The method may further comprise adjusting a flow rate of at least one reactant based on detecting a deviation from a predetermined efficiency level. In at least one embodiment, the desired form of free available chlorine comprises hypochlorous acid.

In accordance with one or more embodiments, a water disinfection process may comprise providing a source of water to be treated, electrolytically generating sodium hypochlorite at a concentration of about 0.2% to about 6% by weight, introducing a first portion of the electrolytically generated sodium hypochlorite to the water, reacting a second portion of the electrolytically generated sodium hypochlorite with hydrochloric acid and sodium chlorite to produce chlorine dioxide, introducing the chlorine dioxide to the water, and collecting a treated water stream. In some embodiments, the process may further comprise producing free available chlorine in a desired form.

In accordance with one or more embodiments, a method of facilitating water treatment may comprise providing a chlorine dioxide generator configured to produce chlorine dioxide and free available chlorine in a desired form using a sodium hypochlorite reagent at a concentration of less than about 6% by weight, fluidly connecting a sodium hypochlorite inlet of the chlorine dioxide generator to an onsite electrolytic sodium hypochlorite generator configured to generate the sodium hypochlorite reagent at a concentration of less than about 6% by weight, and fluidly connecting an outlet of the chlorine dioxide generator to a water treatment system.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF EXPLANATION OF THE DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Figure 1:
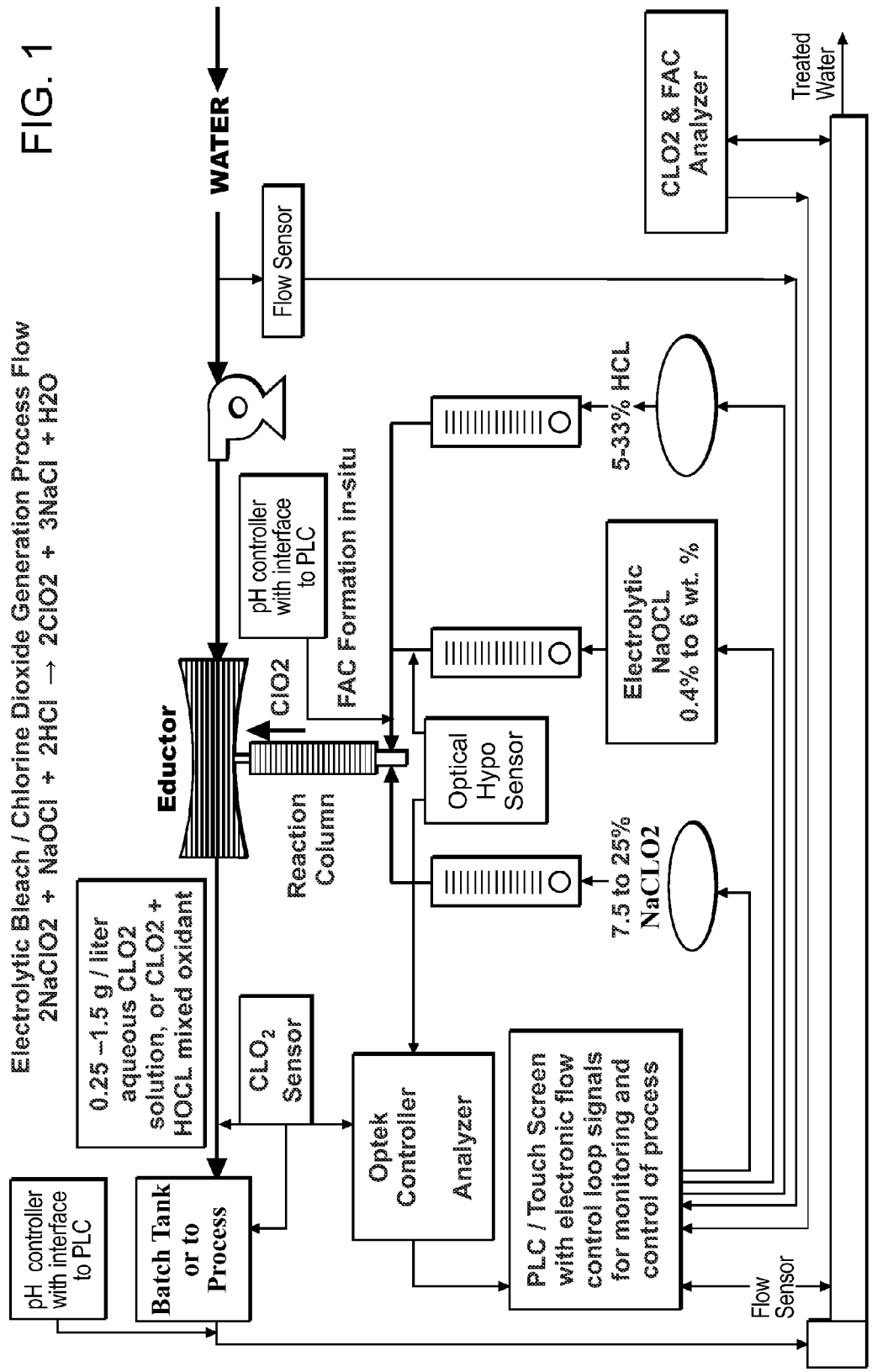
FIG. 1 presents a non-limiting schematic of a chlorine dioxide generation process in accordance with one or more embodiments.

In accordance with one or more embodiments, a chlorine dioxide generator is disclosed that is capable of using dilute reagents to produce chlorine dioxide at a molar conversion efficiency of at least 95%. In some non-limiting embodiments, one or more reagents, such as sodium hypochlorite, may be electrolytically generated from salt on-site for delivery to the chlorine dioxide generator, offering environmental advantages as well as providing benefits in terms of reagent cost and quality. Beneficially, sodium hypochlorite may be used as a chlorine dioxide chemical precursor at any concentration capable of being generated by commercially available electrolytic equipment. Among various applications, the chlorine dioxide generators may be incorporated in an all-liquid disinfection process for water treatment, for example, without use of chlorine gas which is associated with storage and handling concerns. The disclosed systems may produce chlorine dioxide as part of an environmentally friendly mixed oxy-chloro species stream containing free available chlorine for enhanced disinfection. In some embodiments, a product stream may contain chlorine dioxide at a relatively low concentration yet still provide effective disinfection due to the synergistic effects of chlorine dioxide in combination with free available chlorine, such as hypochlorous acid. Process control, including monitoring of pH levels, reagent quality and product stream concentration, may augment the efficiency of the disclosed chlorine dioxide generators.

In accordance with one or more embodiments, an eductor may generally be used to create a vacuum to pull one or more precursor chemicals into a reaction column where they react to produce concentrated chlorine dioxide. The chlorine dioxide then enters the eductor where it is diluted and transported away in solution. Reactor design and operational parameters such as those pertaining to residence time, reaction rate, column size, reactant feed, flow rates, vacuum and concentration of reactants may be varied to produce a product stream of a desired composition and at a high conversion efficiency. For example, in one non-limiting embodiment, the reactor column may be constructed and arranged to accommodate use of low concentration reagents, for example about 0.8% sodium hypochlorite, while generating chlorine dioxide at least at about a 95% molar conversion efficiency.

In accordance with one or more embodiments, a chlorine dioxide generator may be a three chemical or three reactant system. In some non-limiting embodiments, the chlorine dioxide generator may comprise a reaction column and sources of sodium chlorite, sodium hypochlorite and hydrochloric acid reactants fluidly connected to the reaction column. An eductor, such as a substantially seal-less eductor, may provide vacuum to introduce the reactants to the reaction column. In general, the sodium hypochlorite and hydrochloric acid may react to produce chemical intermediates in-situ including hypochlorous acid and chlorine which then interact with sodium chlorite to produce a product stream of chlorine dioxide and free available chlorine as discussed further herein. According to the overall combined reaction sequence, for example, two moles of sodium chlorite may produce two moles chlorine dioxide at a 100% theoretical molar conversion efficiency from sodium chlorite to chlorine dioxide. In at least one embodiment, all-liquid chlorine dioxide generation systems and methods are disclosed. In at least one embodiment, the chlorine dioxide generation systems and processes do not involve vapor-phase chemistry.

In accordance with one or more embodiments, sodium hypochlorite reagent may be electrolytically generated. The sodium hypochlorite may be monopolar or bipolar. In some embodiments, sodium hypochlorite may be electrolytically generated onsite for delivery to the chlorine dioxide generator. Various techniques commonly known in the art for electrolytically generating sodium hypochlorite from salt may be implemented. In one non-limiting embodiment, an OSEC® sodium hypochlorite generator commercially available from Siemens Water Technologies Corp. may be used. Sodium hypochlorite may be used as a chlorine dioxide chemical precursor at any concentration produced by electrolytic generation equipment. In one non-limiting embodiment, electrolytically generated sodium hypochlorite at a concentration of less than about 10% may be used as a reagent. In some embodiments, sodium hypochlorite at a concentration of less than about 6% may be used. In some embodiments, sodium hypochlorite in a concentration range of about 0.2% to about 6% may be used as a reagent. In other embodiments, sodium hypochlorite concentration may be in the range of about 0.4% to about 6%. In some non-limiting embodiments, about 0.8% to about 2.5% sodium hypochlorite may be nominal. In at least one specific non-limiting embodiment, about 0.8% electrolytically generated sodium hypochlorite may be used as a reagent. In some embodiments, the concentration of sodium hypochlorite used as a reagent may be related to the specifications of an on-site electrolytic sodium hypochlorite generator available for integration into a larger system. Beneficially, using relatively weak sodium hypochlorite reagent, particularly that generated on-site, may provide advantages in terms of environment, shelf-life and stability. Generating the sodium hypochlorite on-site from salt provide cost savings in terms of raw materials, transportation and storage.

In a general example of the process for producing chlorine dioxide, the primary precursor chemical may be a sodium chlorite solution, normally at a concentration of about 25%. In some non-limiting embodiments, the hydrochloric acid used may be at a concentration of about 15%. At times, other concentrations may be used as are commercially available, but may change the reaction chemistry. The sodium hypochlorite may be introduced at a concentration of between about 0.2% and 6%. In at least one embodiment, chlorine dioxide is generated at a high efficiency of at least about 95% without supplying chlorine gas, 12.5% sodium hypochlorite or sulfuric acid reagents to the system.

FIG. 1 presents a schematic of a three-chemical reactant chlorine dioxide generation system in accordance with one or more embodiments. The reactants may include sodium chlorite, hydrochloric acid and sodium hypochlorite. In some non-limiting embodiments, about 0.2% to about 6% sodium hypochlorite is fed and reacted substantially instantaneously with 15% hydrochloric acid ahead of the vacuum based reaction column. A chemical intermediate is therefore produced just ahead of the sodium chlorite injection point. The intermediate may react substantially instantaneously with the sodium chlorite to produce a product stream of chlorine dioxide and free available chlorine. Each of these two reaction mechanisms and processes are highly efficient in respect to the molar conversion efficiency from sodium chlorite to chlorine dioxide.

In accordance with one or more embodiments, a pre-reaction column may be used to pre-mix the sodium hypochlorite and hydrochloric acid to form a mixture of chlorine and hypochlorous acid. This mixture may then form chlorine dioxide upon contact with sodium chlorite. A primary reaction column may be implemented to allow sodium chlorite to react with the chlorine and hypochlorous acid prior to dilution with motive water. Column size and other design parameters may be varied according to a desired production rate.

In some non-limiting embodiments, a three-reactant system is designed to operate using about 0.2% to about 6% by weight sodium hypochlorite reacted in a precise and constant proportional ratio with about 15% hydrochloric acid and about 25% (or 31%) by weight sodium chlorite. In accordance with one or more embodiments, onsite generated 0.2% to 6.0%, in some non-limiting examples more typically 0.6% to 6.0% sodium hypochlorite as produced from salt via an electrolytic sodium hypochlorite generator, may be used as a chemical precursor in lieu of higher strength commercial 10-13% sodium hypochlorite which is traditionally used in chlorine dioxide generation. Such systems may deliver a minimum 95% yield and minimum 95% molar conversion efficiency from sodium chlorite to chlorine dioxide. The typical conversion efficiency and yield are each 95-99% at a relatively high purity.

Figures 2A, 2B:
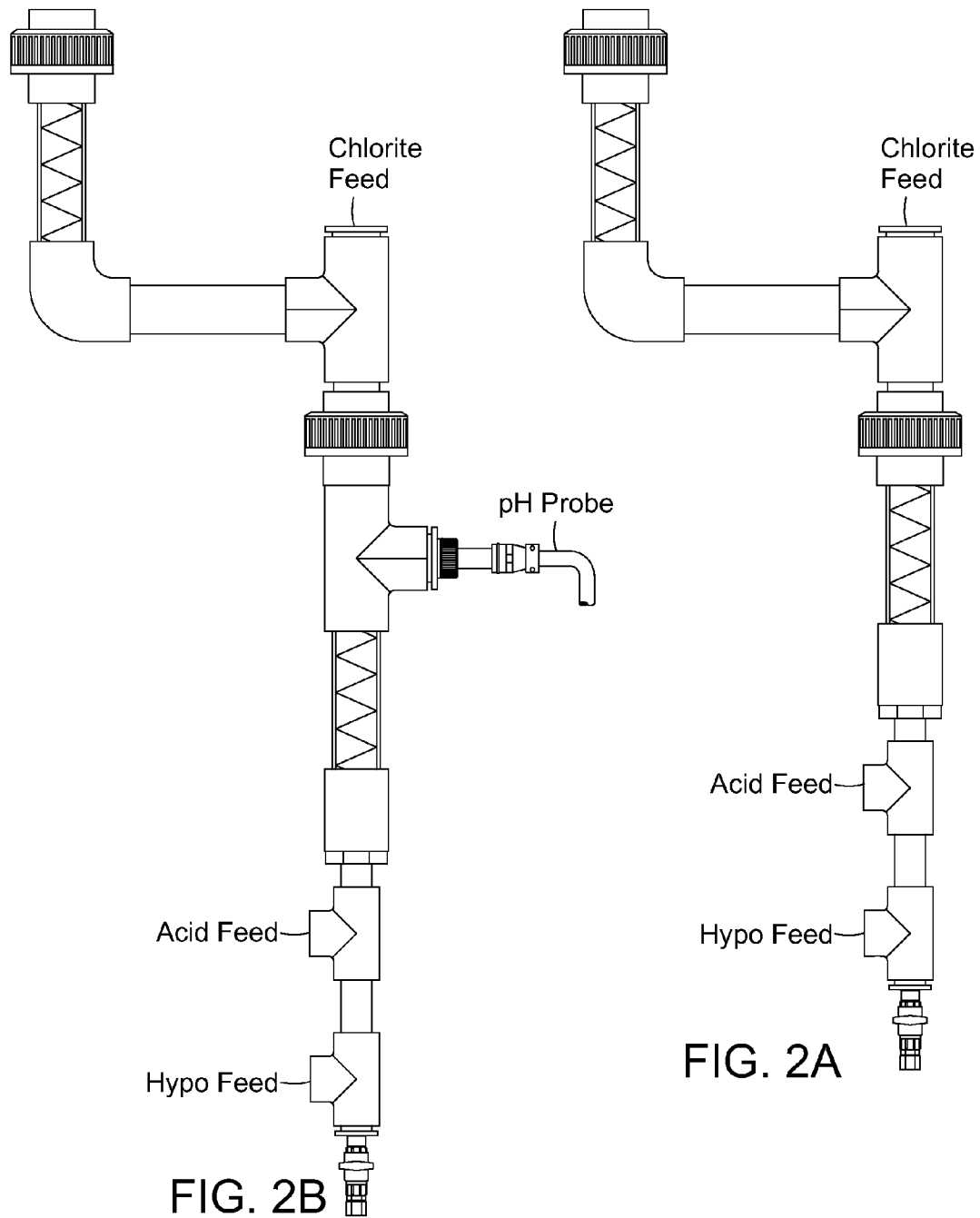
FIGS. 2A-2B present non-limiting schematics of chlorine dioxide generation reactant inlets without and with a pH sensor respectively, in accordance with one or more embodiments.

In accordance with one or more embodiments, a chlorine dioxide generator may produce a mixed oxy-chloro species product stream. By feeding excess electrolytically generated sodium hypochlorite and hydrochloric acid, an excess of free available chlorine may be produced in the form of hypochlorous acid and chlorine above the 100% stoichiometric requirement based on the overall reaction stoichiometry. In some non-limiting embodiments, a mixed aqueous chlorine dioxide and free available chlorine disinfectant product stream may contain from about 6% to 21% free available chlorine in addition to chlorine dioxide ranging from about 0.4 to 1.1 grams per liter. By adjusting the feed water flow rate driving the vacuum eductor of the generator, for example, the chlorine dioxide concentration in the produced aqueous disinfectant and oxidizer feed stream can be additionally adjusted, for example to from about 0.1 to 5.0 grams per liter as chlorine dioxide, with the free available chlorine in similar proportion in the feed disinfectant stream ranging from about 6% to 21% by weight. In some embodiments, the pH of the aqueous produced chlorine dioxide and chlorine dioxide/free available chlorine mixed oxidant streams produced via a combined reactor and electrolytic sodium hypochlorite generation process can be from about pH 2.0 to 7.5, and more nominally about pH 3.5 to 6.5. As discussed herein, pH control may be an element in a process control mechanism. For example, pH control may optimize hypochlorous acid production from the dilute sodium hypochlorite and acid reaction. As illustrated with respect to FIGS. 2A and 2B, a pH sensor may be associated with a chlorine dioxide generator. In some non-limiting embodiments, a pH sensor may be positioned downstream of the sodium hypochlorite and hydrochloric acid inlets. A pH sensor may be positioned upstream of a sodium chlorite inlet. The pH sensor may be strategically positioned in other parts of the system as desired.

In accordance with one or more embodiments, the disclosed generator systems may provide an all liquid integrated disinfection process for municipal potable and wastewater, and industrial water such as cooling tower water that avoids handling and storage of chlorine gas onsite. The systems may also reduce carbon footprint of chemical deliveries by avoiding the need for external 10-13% (nominally 12.5%) sodium hypochlorite purchases and deliveries. The systems may also allow for onsite generated electrolytic sodium hypochlorite to be fed to a distribution system in addition to high purity chlorine dioxide, or a high purity tuned chlorine dioxide/free available chlorine mixed oxidant stream, to be fed to the raw incoming water for preoxidation and primary disinfection at the front end of a potable water plant treatment process without need for purchasing chlorine gas or sodium hypochlorite. In this way, enhanced disinfection synergism using a combination of chlorine dioxide and free available chlorine may be achieved. In some embodiments, a desired free available chlorine concentration may be inputted to a system controller for process control.

The systems beneficially help to avoid the cost and shelf life issues associated with 10-13% purchased sodium hypochlorite. Beneficially, starting with salt to electrolytically produce sodium hypochlorite improves the cost per pound of producing chlorine dioxide in comparison to traditional three chemical chlorine dioxide production processes which rely upon use of higher strength purchased 10-13% sodium hypochlorite. Further, using freshly produced sodium hypochlorite via the electrolytic process avoids other sodium hypochlorite shelf life issues as to perchlorate formation over time. There has been an increased level of interest regarding perchlorate and chlorate contamination levels, particularly in municipal potable water distribution systems. Action levels for perchlorate and chlorate in potable water distribution systems are known to be as low as 5 ppb and 200 ppb respectively. Aged 12.5% sodium hypochlorite in a storage tank can produce increasing chlorate levels and sometimes perchlorate over time due to the contained chlorate concentrations in the 12.5% old sodium hypochlorite, the degradation taking place and the chemical/light interactions taking place over time. Freshly produced electrolytic sodium hypochlorite does not have similar perchlorate issues. Thus, in accordance with one or more embodiments, using onsite electrolytically produced sodium hypochlorite may beneficially reduce the propensity for introducing perchlorate and/or additional higher chlorate levels in the chlorine dioxide product stream of the disclosed three chemical processes.

In accordance with one or more embodiments, an onsite sodium hypochlorite generator may be fluidly connected to a chlorine dioxide generator. The onsite sodium hypochlorite generator may already be in use for distribution system injection of sodium hypochlorite, such as for final disinfection. A side-stream of electrolytically generated sodium hypochlorite may be fed to the chlorine dioxide generator. The chlorine dioxide may be added, for example, at the front end of a water treatment plant for preoxidation and primary disinfection. Chlorine dioxide reduces particle count, THM's and THAA precursors in an overall treatment process and may add CXT (crypto and giardai) disinfection credits. A mixed oxidant stream of chlorine dioxide and free available chlorine, which can be produced via the disclosed systems and methods without chlorine gas or purchased 12.5% sodium hypochlorite, may minimize THM's and THAA's while providing combined enhanced synergism as to the mixed chlorine dioxide and free available chlorine disinfectant streams.

In accordance with one or more embodiments, disclosed chlorine dioxide generators may be manual or automatic systems. As discussed further herein, automatic systems may involve a controller in communication with various sensors, valves and other components including auto metering valves, magnetic flow meters, and optical analyzers for control over various parameters such as reactant feed and product generation.

While some reactants, such as hydrochloric acid and aqueous sodium chlorite are generally shelf-life stable, sodium hypochlorite may degrade over time. As a result of degradation, the reaction ratios may suffer, an overfeed of chlorite can occur, and the overall reaction ratios, reaction efficiency, chlorine dioxide production rate can suffer and this can also increase undesired reaction by-products (salts, oxygen, chlorite, chlorate) in the chlorine dioxide being produced due to side reactions occurring. A less pure aqueous chlorine dioxide stream delivered to the use point may result.

In the three chemical process described above, sodium hypochlorite reactant may constantly degrade over time. In accordance with one or more embodiments, the systems and methods may account for the degradation. In some embodiments, feed rates of the sodium hypochlorite (sodium hypochlorite) and/or reaction ratios may be adjusted to compensate for the reduced strength of the sodium hypochlorite.

In accordance with one or more embodiments, one or more sensors may be incorporated to detect, measure and/or monitor the concentration of one or more reactants. A sensor may be positioned along a reactant feed line. In some embodiments, the sensor may be an optical analyzer. In at least one embodiment, the concentration of sodium hypochlorite may be measured by the sensor. The sensor may measure the reactant concentration continuously or intermittently. The monitoring may provide information, such as real time information, to a controller. The controller may include a program configured to make automatic adjustments to reactant flow rate based on the concentration data supplied by the sensor to optimize chlorine dioxide generation. For example, in one non-limiting embodiment involving three-reactants, a hypo analyzer may be positioned along the sodium hypochlorite feed line and provide information to the PLC program which can adjust the sodium hypochlorite valve position in response to concentration variations. In some embodiments, a relationship between reactant concentration and reactant flow rate may be established to facilitate control of valve position.

Figure 3:
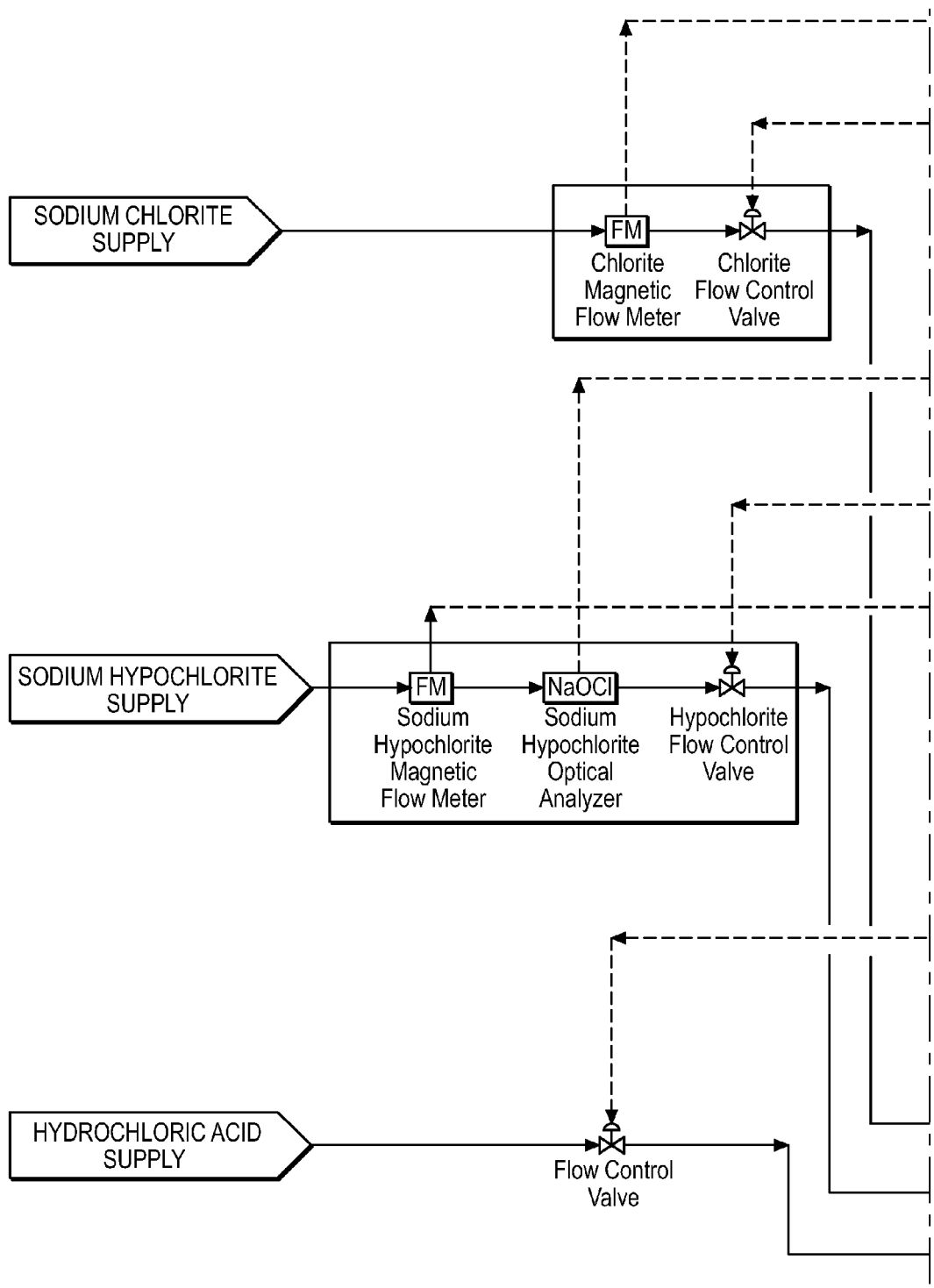
FIG. 3 presents a non-limiting control schematic of a chlorine dioxide generation process in accordance with one or more embodiments.
Figure 3:
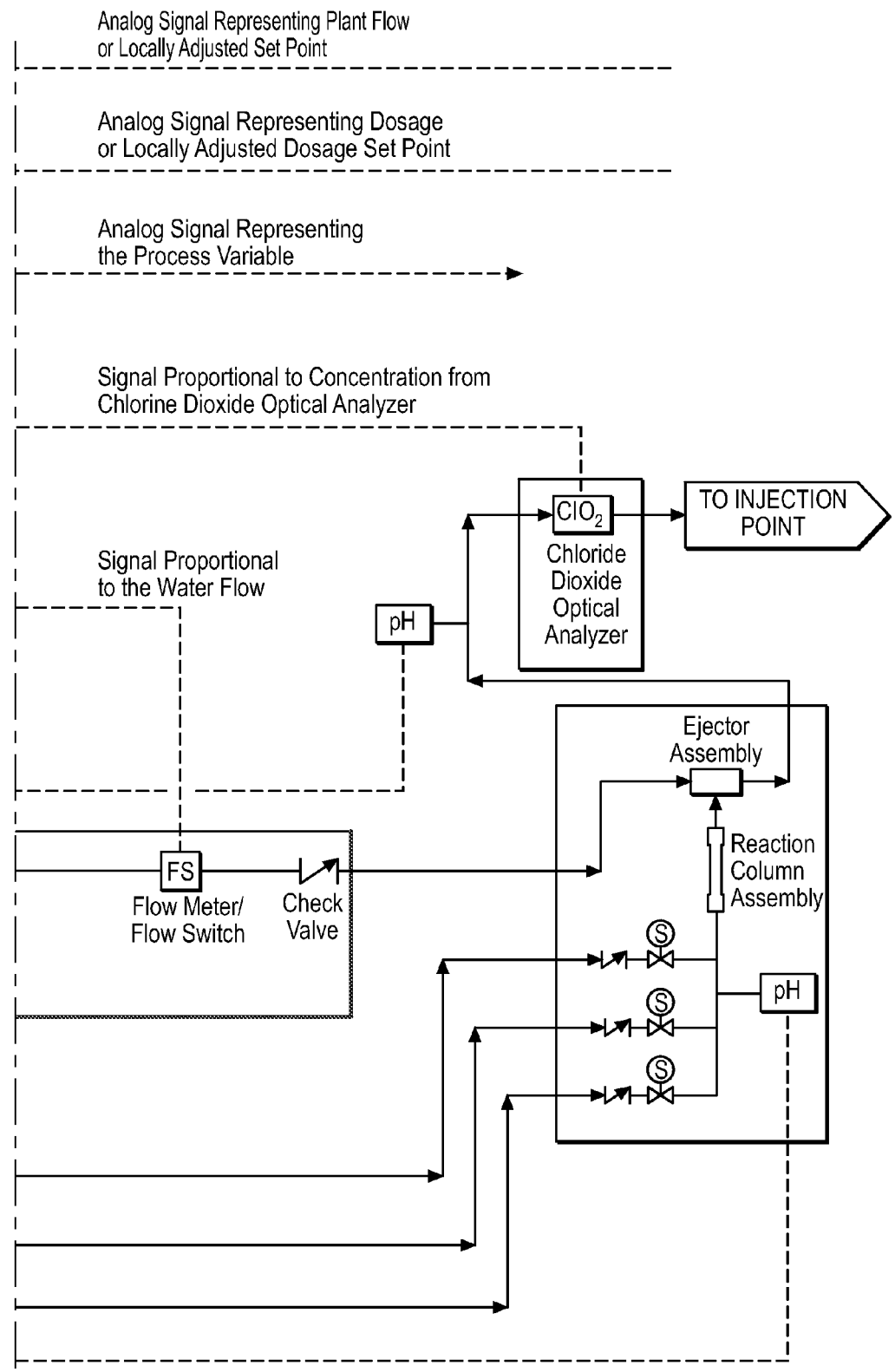
Figure 4:
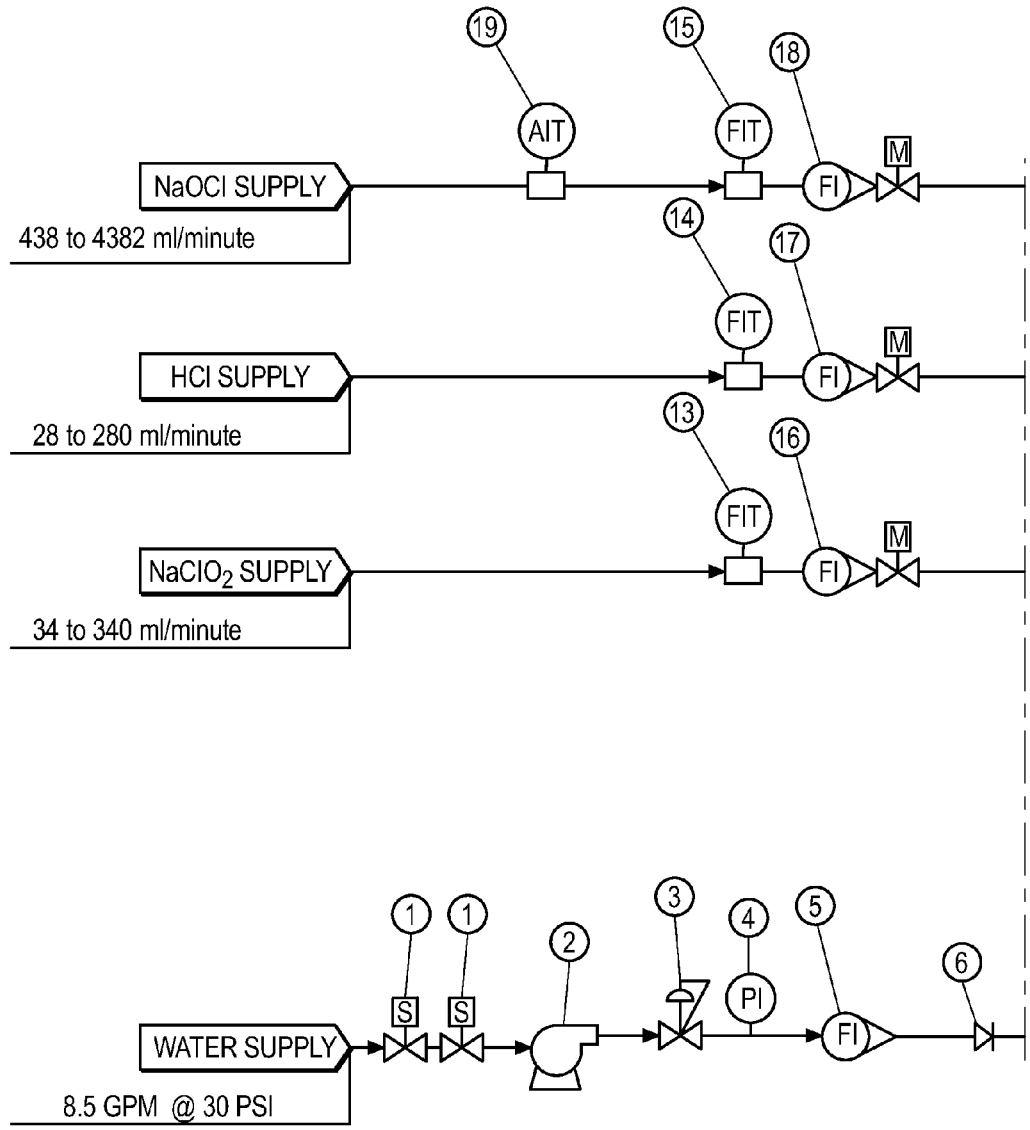
FIG. 4 presents a non-limiting chlorine dioxide generation process flow diagram in accordance with one or more embodiments.
Figure 4:
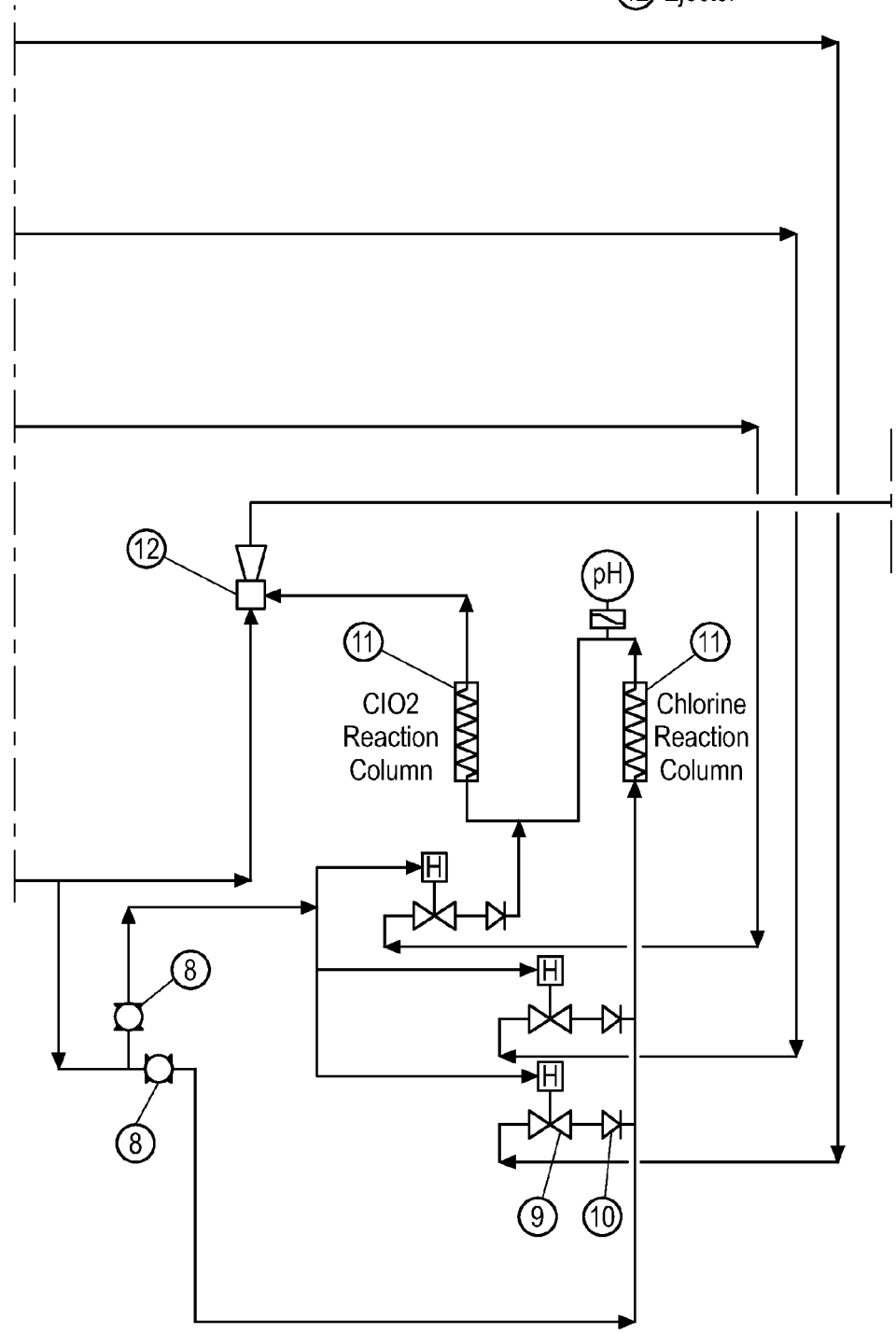
Figure 4:
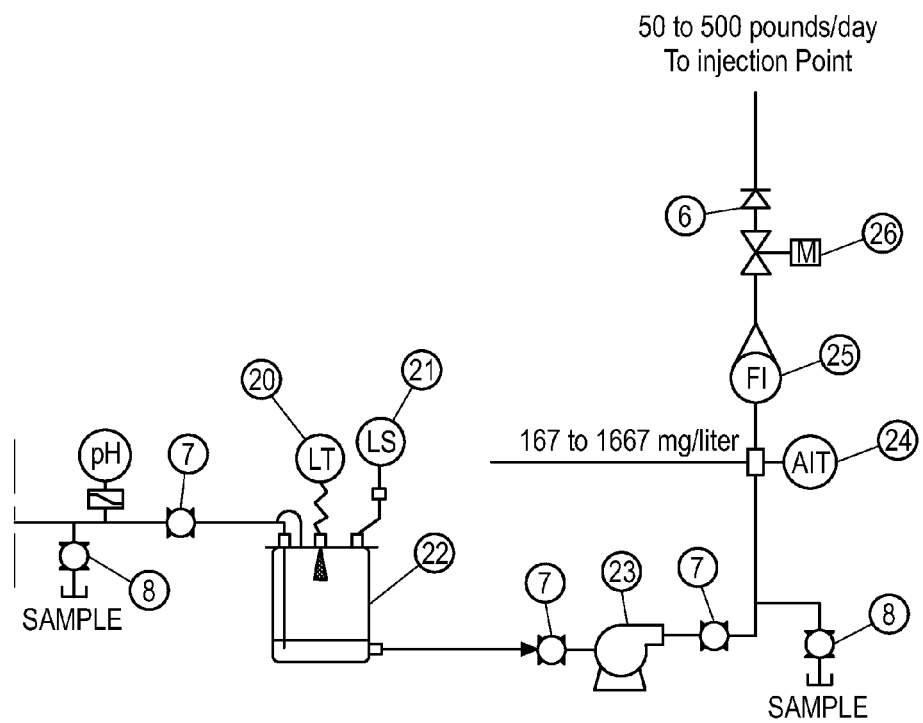
Figure 5:
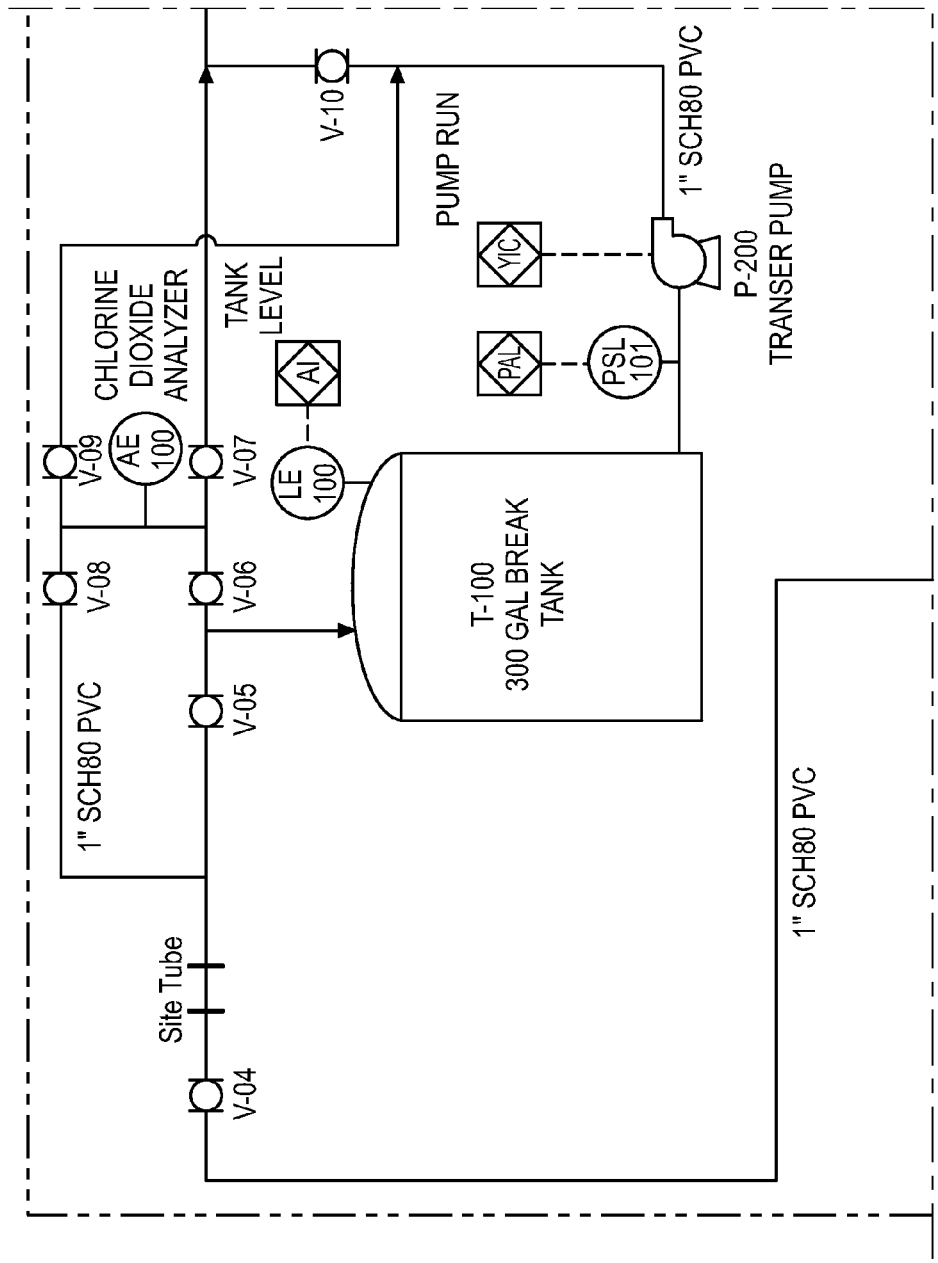
FIG. 5 presents a non-limiting process and instrumentation diagram of a chlorine dioxide generation system in accordance with one or more embodiments.
Figure 5:
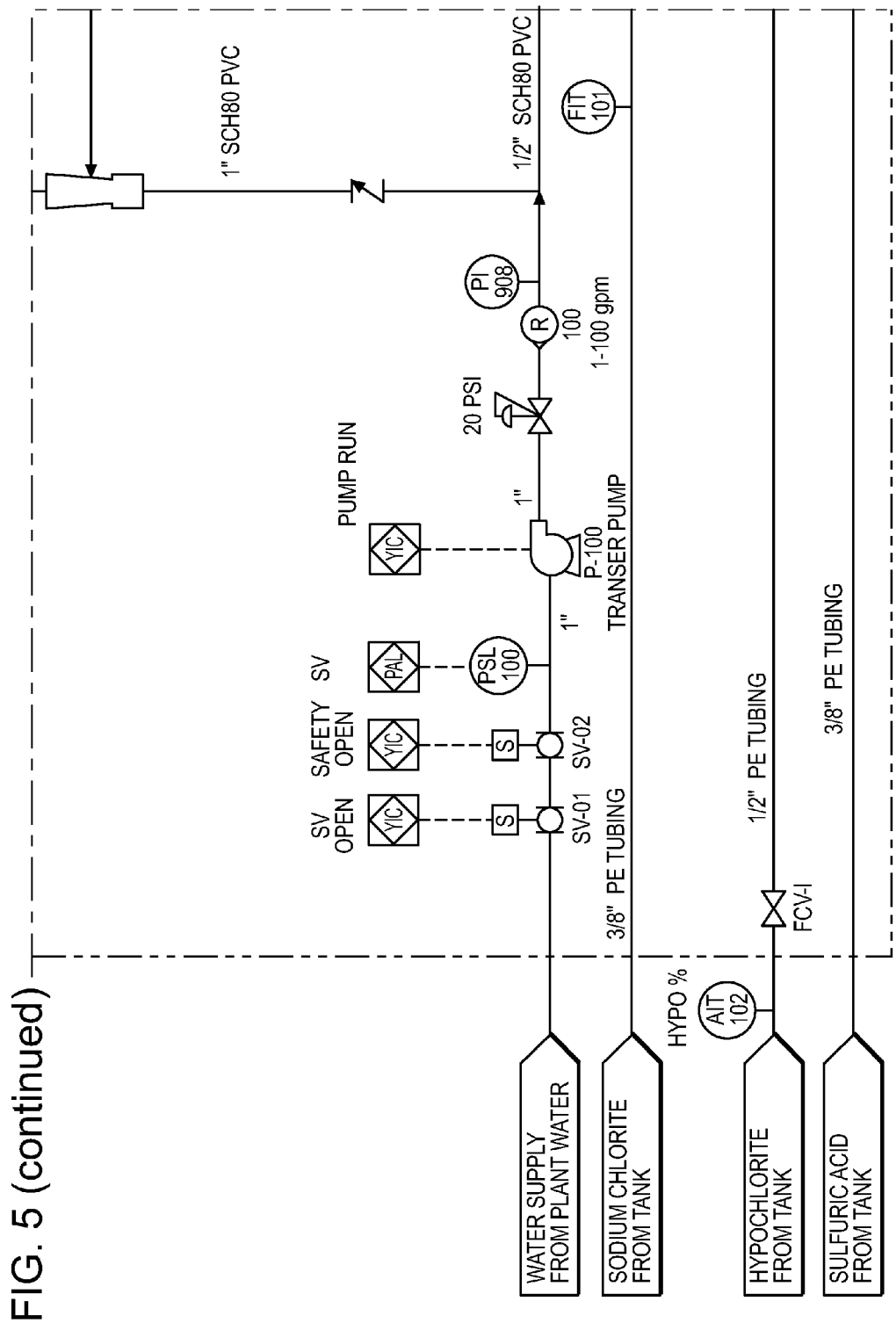
Figure 5:
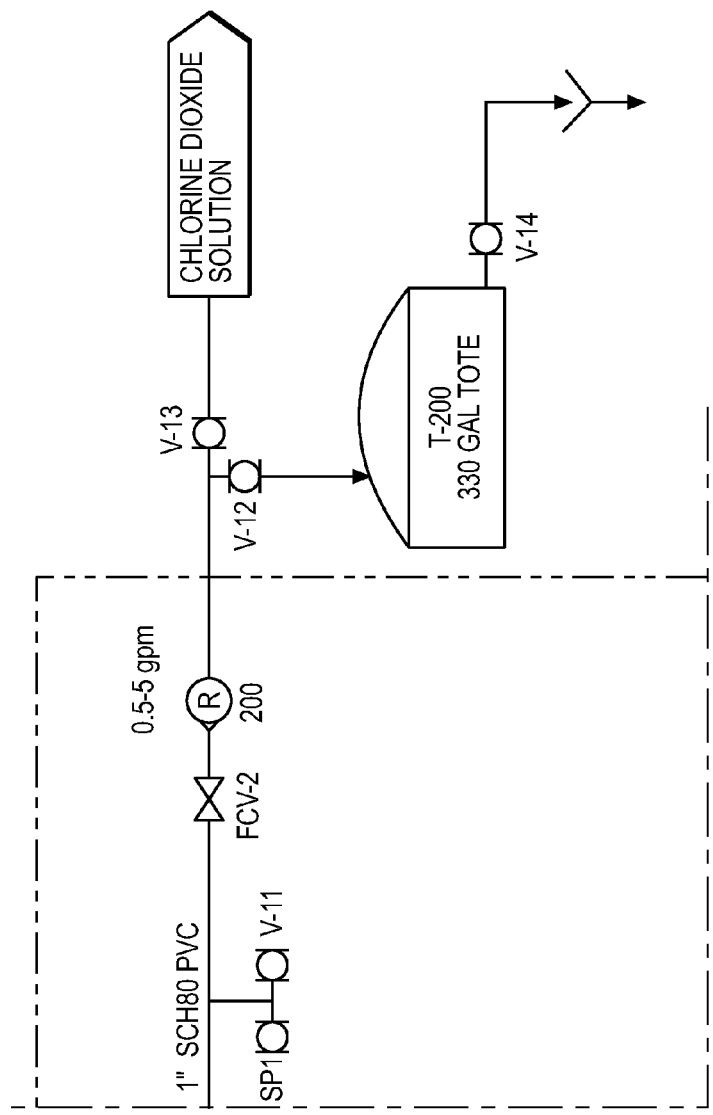
Figure 5:
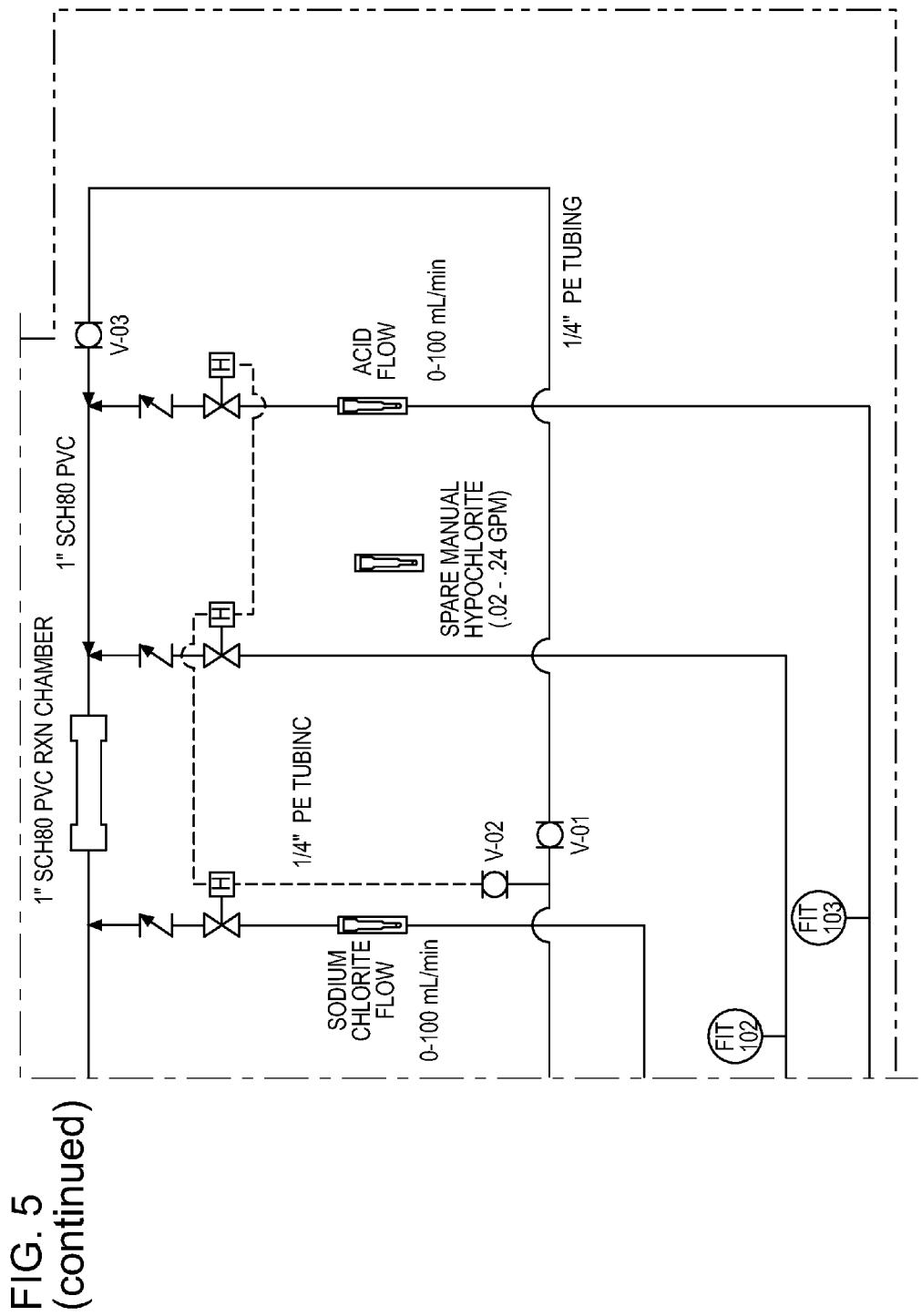

FIG. 3 presents a non-limiting control schematic of a chlorine dioxide generation process in accordance with one or more embodiments. FIG. 4 presents a non-limiting chlorine dioxide generation process flow diagram in accordance with one or more embodiments. FIG. 5 presents a non-limiting process and instrumentation diagram of a chlorine dioxide generation system in accordance with one or more embodiments.

In accordance with one or more embodiments, in-line real time optical sensors may be used in conjunction with a controller capable of sending an electronic signal to the system's PLC, so as to monitor the real time concentration of sodium hypochlorite that is being fed to the reaction column and to simultaneously allow and control an automatic flow/feed adjustment (via PLC interaction with the auto metering control valve) of the sodium hypochlorite feed rate that is fed to the reaction column. The precise correct stoichiometric sodium hypochlorite feed ratio (based on its actual strength) with the acid feed and chlorite feed rates required to be fed to the generator's reaction column may be automatically adjusted and maintained in real time to maintain optimum reaction efficiency, yields and high conversion efficiency.

In accordance with one or more embodiments, the in-line "real time" measurement of sodium hypochlorite concentration further allows the PLC/PID Loop/programming interface to automatically adjust/increase (or otherwise decrease) either or both the sodium hypochlorite and acid feed rates above the stoichiometric required ratio, while holding the chlorite feed rate constant, thus allowing the system to produce chorine in excess, which thus allows for the delivery a mixed oxidant stream containing a synergistic mixture of chlorine dioxide and free available chlorine in various ratios. This may provide synergistic benefits when treating potable water, wastewater, cooling water and any other water stream or process (air or water treatment) requiring oxidation and/or disinfection.

For example, it may be desirable to dose a water stream or process (example potable water, wastewater, cooling tower water, white-water biocide water application in paper machines, sodium hypochloriteing processes, etc, or a water or air stream or hydrocarbon containing stream in an environmental treatment application) with either high purity chlorine dioxide containing very little to no excess measurable chlorine or sodium hypochlorite. In other embodiments it may be desirable to dose the process (example, potable, wastewater, cooling tower, etc.) with a co-produced mixture of chlorine dioxide and a defined amount of excess chlorine, in the form of free available chlorine such as hypochlorous acid, the concentrations of which can be dialed in via the PLC control system interface.

In accordance with one or more embodiments, an optical analyzer/sensor may monitor chlorine dioxide strength produced by the generator, while also simultaneously using a second optical hypochlorite sensor to automatically control sodium hypochlorite feed (measuring inline the real time strength of sodium hypochlorite fed to the generator's reaction column) (interfaced with PLC via electronic signal for control of the sodium hypochlorite feed). Vacuum may be used to meter the reagents through auto metering control valves. In some non-limiting embodiments, LVN 2000 or Omni Hydro metering valves may be used.

In accordance with one or more embodiments, using the three chemical method, a mixed stream of oxidants (chlorine dioxide plus free available chlorine in the exiting stream of the generator) may be dialed-in to the PLC with the actual real time strength of the sodium hypochlorite being detected. Sodium hypochlorite plus acid in the proper stoichiometric ratio yields chlorine and hypochlorous acid which then reacts substantially instantaneously with sodium chlorite under vacuum with chlorite to produce chlorine dioxide in a high efficiency reaction that occurs on a stoichiometric basis. By pre-reacting sodium hypochlorite with excess acid (before either see chlorite), chlorine may be produced in-situ. (2 moles chlorine gas plus 2 moles chlorite yields two moles chlorine dioxide.) If more sodium hypochlorite and more acid is fed to produce chlorine in excess (in excess of the stoichiometric chlorite requirement) a mixed aqueous oxidant stream (chlorine dioxide plus excess free available chlorine, for example hypochlorous acid) may be produced exiting the generator to treat the water.

In accordance with one or more embodiments, the chlorine dioxide/free available chlorine mixture may be produced under vacuum before dilution in the water that is driving the vacuum eductor on the generator. This mixture may be ejected as formed to that water stream and that exits the generator in the form of a mixed aqueous chlorine dioxide and chlorine oxidant feed stream that is fed automatically to downstream application points. As the excess molecular chlorine that was created in the reaction column dissolves in that same eductor/motive water dilution stream, the excess chlorine forms some hypochlorous acid which is a strong disinfectant. The combination of chlorine dioxide, chlorine and hypochlorous acid is synergistic as to microbiological control and disinfection. The reaction of chlorine dioxide to oxidize humic and fulvic acids is kinetically so fast that the simultaneous addition of chlorine dioxide with chlorine and hypochlorous acid avoids THM and THAA formation, which is controlled by EPA at max MCL limits. If chlorine/hypochlorous acid were added ahead of chlorine dioxide or singly without chlorine dioxide, then THM's and THAA's would form. Chlorine dioxide oxidizes the humic and fulvic acids, and other natural organics, into a form that do not react with chlorine or hypochlorous, or otherwise minimizes the chlorine/hypochlorous acid reaction with the organics that otherwise would be chlorinated.

In accordance with one or more embodiments, a high purity chlorine dioxide stream at >95% molar conversion efficiency may be generated from chlorite to chlorine dioxide containing <5% excess chlorine in the feed stream exiting the generator. Alternatively, a mixed oxidant stream of chlorine dioxide that contains excess chlorine, for example, more than about 5%, can be produced while still achieving at least about 95% molar conversion efficiency of chlorite to chlorine dioxide. The amount of excess chlorine in the exiting generator stream desired may be dialed-in. In some embodiments, no pH control may be used. In other embodiments, no reagent metering pumps may be used. In accordance with one or more embodiments, systems and methods may be automatically controlled with generator self-tuning capabilities via use of two optical sensors interfaced with the generators PLC program control system.

In carrying out the process, the reactants are fed into a reaction column and react to produce concentrated chlorine dioxide solution where the concentrated chlorine dioxide solution enters the eductor where it is diluted and transported away as a solution.

In a non-limiting three-chemical process for producing chlorine dioxide, sodium chlorite solution 25% by weight; sodium hypochlorite 0.6% to 6% by weight and hydrochloric acid 15% by weight are fed into the eductor where a vacuum is produced to pull the precursor chemicals into a reaction column where they react to produce concentrated chlorine dioxide generator, the system is monitored for optimum chlorine dioxide concentration. If the chlorine dioxide concentration is too high, sodium chlorite feed is reduced; and if the concentration is too low, sodium hypochlorite and hydrochloric acid feeds are increased.

In the system, the chlorine dioxide level may be determined by an optical analyzer. The optical chlorine dioxide analyzer analyzes for the yellow-green color of the chlorine dioxide in the aqueous solution, and provides an independent value to the process controller that is used to compute the chlorine dioxide production rate. This value is compared to the chlorine dioxide production rate as calculated from the sodium chlorite flow rate. The resulting comparison provides verification of efficiency, or uses a PID loop involving the optical analyzer, a reactant control valve and the process controller to increase the efficiency to the desired level. This automated efficiency feature guarantees the quality of the chlorine dioxide produced. In the event optimum chlorine dioxide is not being produced, the process controller will make the following adjustments: (1) open a reactant valve incrementally, (2) observe any change in efficiency, (3) repeat until acceptable, and (4) if an increase in reactant flow does not improve the efficiency, the controller will close the reactant valve incrementally until the efficiency improves to the desired level.

In accordance with one or more embodiments, the system may further include a first sensor configured to detect a flow rate of at least one reactant delivered to the reaction column. The system may also include a second sensor configured to detect a chlorine dioxide concentration of a product stream generated by the system. The system may still further include a controller in communication with the first and second sensors. The controller may be configured to determine a theoretical chlorine dioxide production rate based on the flow rate of the at least one reactant detected by the first sensor, determine an actual chlorine dioxide production rate based on the chlorine dioxide concentration detected by the second sensor, monitor a system efficiency based on the theoretical chlorine dioxide production rate and the actual chlorine dioxide production rate, and adjust flow of at least one reactant to the reaction column based on the system efficiency. In at least one embodiment, the measure of efficiency for the process relates the actual amount of chlorine dioxide produced compared to the theoretical amount, based upon the quantity of sodium chlorite used.

In accordance with one or more embodiments, the system may further include an optical analyzer positioned along a feed line fluidly connecting the source of sodium hypochlorite to the reaction column. The optical analyzer may be configured to detect a concentration of sodium hypochlorite provided to the reaction column. The controller may be in further communication with the optical analyzer and may be further configured to adjust a flow rate of sodium hypochlorite to the reaction column based on the detected sodium hypochlorite concentration.

In accordance with one or more embodiments, a chlorine dioxide generator may involve a pH control scheme. Generators may include pH control, monitoring and PLC feedback mechanism in addition to sodium hypochlorite concentration monitoring and chlorine dioxide concentration monitoring. For example, Optek® real time chlorine dioxide and sodium hypochlorite sensors may be integrated with PLC control as discussed further below as part of the chlorine dioxide generation process. pH control may be an important consideration when adding low strength sodium hypochlorite, such as 0.8% electrolytically generated sodium hypochlorite with 99.2% volume of water with 15% hydrochloric acid to insure optimum pH. pH control may be done manually or automatically by monitoring pH in the system, for example, ahead of sodium chlorite addition to optimize hypochlorous acid and chlorine formation in-situ from the sodium hypochlorite and acid reaction. Hypochlorous acid and chlorine reside together in a chemical equilibrium with the percent of each being pH dependent. The pH relationship among various chlorine species is commonly known to those skilled in the art. Thus, to produce chlorine dioxide in high efficiency, it is generally desirable to maximize the percent of hypochlorous acid and chlorine over sodium hypochlorite. Chlorine dioxide will react with sodium hypochlorite rapidly in a first order kinetic reaction to create chlorate. Chlorine dioxide is produced from the chlorite reaction with hypochlorous acid and chlorine, but chlorine dioxide will also react with hypochlorous acid slowly in water to form some chlorate as a side reaction. Chlorine dioxide reacts much slower with hypochlorous acid than with hypochlorite, and with molecular chlorine even more efficiency minimizing chlorate by-products. If the pH is too high, a lot of hypochlorite is present to contact the sodium chlorite which is generally undesirable. Hydrochloric acid may be added to an aqueous chlorine gas/chlorite reaction to drive pH down to around 3.5 to optimize hypochlorous acid species formation in water from chlorine (or sodium hypochlorite). pH may be monitored on the output stream of the generator, for example, if chlorine gas is being added to water first.

FAC is a mixture of hypochlorite, hypochlorous acid and chlorine, with each present in a certain concentration depending on pH of the water and conditions under which they reside. For optimum chlorine dioxide generation from chlorite, FAC species may be optimized around hypochlorous acid, chlorous acid and chlorine. For example, excess sodium hypochlorite present and excess alkalinity (OH—) seeing sodium chlorite may be undesirable as that creates chlorate rapidly in a first order kinetic reaction, particularly in low strength aqueous solutions. pH control may be important to optimize the sodium hypochlorite and hydrochloric acid reaction chemistry going in the right direction in correct proportions to optimize hypochlorous acid, chlorous acid and chlorine present when chlorite is introduced into the system.

In accordance with one or more embodiments, pH may monitored within the process ahead of the chlorine dioxide reaction column following the hydrochloric acid and sodium hypochlorite. pH may also be monitored in an exit stream of the generator. pH monitoring may be tied into the PLC/PIID loop for monitoring and optimization of the overall reaction scheme as well as intermediary reactions. For example, optimizing pH to optimize the maximum production of high purity hypochlorous acid and chlorine species may be important as it relates to the system's ability to deliver a synergistic mixed oxidant stream of chlorine dioxide and free available chlorine.

In accordance with one or more embodiments, a signal from either an external or local source representing set point, flow and/or dosage may be input to a process controller. The controller may signal a sodium chlorite control valve to open and to supply the required flow utilizing a magnetic flow meter and PID loop. The controller may also signal the sodium hypochlorite control valve to open and to supply the required flow utilizing the magnetic flow meter, a multiplier based upon the hypochlorite concentration analyzer, and PID loop. The controller ma further signal the hydrochloric acid valve to open and supply sufficient flow to produce the pH as measured after the acid and hypochlorite have combined. The pH is a user selectable value, and a standard pH control method is used. Continuous or intermittent monitoring of the eductor water flow, chlorine dioxide concentration and pH level may provide additional process controller inputs which provide for additional data to optimize the sodium hypochlorite flow automatically. Thus, the chlorine dioxide generator may be a self-tuning system. Acid feed may automatically follow with the pH control employed.

In accordance with one or more embodiments, the chlorine dioxide generation system does not use gravity feed. Gravity feed (without elevated tanks) may not reliably provide enough motive force for adequate flow. In addition, modern feed practices for chlorine gas require the use of an eductor. This is a safety issue that has been adequately addressed with vacuum regulators and other components that "fail safe" when a line break or other interruption occurs. All liquid feeds for the chlorine dioxide generation system use vacuum eductors. This is particularly advantageous in that with a break in the liquid-feed, the vacuum is broken and the system is signaled to shut-down. A vacuum eductor is used for the reactant supply, and is used in the system for the other chemicals as well. Further, there are inherent safety features associated with eductor feed systems that include automatic shut down of chemical flows when the vacuum is lost, air in-leakage when a line develops a leak, etc.

In accordance with one or more embodiments of the disclosed chlorine dioxide generator, the precursor chemicals may be supplied in a system wherein the reaction column, check valve/metering valve assembly, chemical rotameters, tubing connectors and water bleed inlet valve are joined free of o-rings and using devices designed to seal without the use of o-ring seals. The chlorine dioxide generation system has precursor chemicals supplied through flow meters, valves and other fittings that are substantially free of o-rings.

In accordance with one or more automatic systems, a programmable logic controller may control the amount of chemicals fed into the system by analyzing the amount of chlorine dioxide produced. For example, the amount of chemical fed to the system is controlled by a flowmeter which in turn is controlled by the programmable logic controller. The chlorine dioxide generation system of this invention may be defined as one programmed for efficiently manufacturing chlorine dioxide wherein the values of precursor chemicals for manufacturing the chlorine dioxide are supplied to a programmable logic controller and with the programmable logic controller continually making adjustment of the precursor chemicals based on the desired amount of chlorine dioxide to be produced to insure that a substantially optimum amount of chlorine dioxide is produced. In the system all liquids are delivered by vacuum eductors which may be seal-less vacuum eductors. The chlorine dioxide generation system incorporates a touch screen that allows the operator to look at data, make changes and monitor operating conditions. The touch screen provides a "Human-Machine-Interface" for ease in monitoring operation and making changes.

In accordance with one or more embodiments, the chlorine dioxide generation system may have incorporated therein a proportional, integral and derivative loop. The data fed to the process controller may include among other information, (1) all of the real time information from the precursor chemical electronic flow meters, (2) the eductor water flow meter, (3) the optical analyzer, and (4) other devices that indicate a status via a contact or relay. In addition, (5) input signals from customer devices such as flow meters or dosage settings, along with status indicating devices. The process controller uses all analog signals to determine and control the chemical flows required, and sends output signals to the appropriate control valves to assure proper flow rates. The status signals received are compared to what the process controller expects during normal operation, and are continuously monitored.

For example, if a sensor that detects the concentration of chlorine dioxide in air set to close a contact when the concentration exceeds a preset level is connected to the process controller, then that device is continuously monitored by the controller. If the contacts close, indicating a level of chlorine dioxide in air higher than the preset level, the process controller will indicate an alarm condition that will be followed by automatic unit shut down and alarm notification such as a horn, light, or other device.

The chlorine dioxide generation system also may have a shut-down signal for no flow, low flow, empty tank, gas-in-air and/or set point deviation and may be programmed to compare the current month's consumption of chemicals with past months' consumption of chemicals.

In operation, the mass dispersion reactant flowmeter sends a signal to the process controller which in turn adjusts the control valve (to open or close). In this way, the production of chlorine dioxide can be efficiently produced.

This is a true molecular chlorine reaction with chlorite that occurs in milli-seconds under vapor phase vacuum conditions. Vacuum may be created by a motive stream of water driving a vacuum eductor that serves also to pull in the reacants through rotameters and/or a combination of auto metering control valves and rotameters. This allows the reactants to be fed to the reaction column in a very precise ratio. The rotameters can be controlled manually by setting the rotameters at the proper setting for the precise feed ratio required, or the feed rates of the reactants can be controlled automatically using the auto metering control valves interconnected with a PLC via a PID electronic loop. Special programming may be contained within the PLC to maintain proper feed rates of the reactants.

In accordance with one or more embodiments, the chlorine dioxide generation system may be manual or automatic. In some embodiments, the unit's production rate can be controlled at a local or remote set point (in pounds per day of chlorine dioxide) automatically. The efficiency of the unit may be dependent upon the linearity of the flow of reactant through the reactant control valve and the valve position. In at least one embodiment, there is no feed-back adjustment of controls. Automatic efficiency protocols may be supported by an electronic reactant flowmeter and an optical chlorine dioxide analyzer. The reactant flowmeter (rotameter) allows for independent and accurate application of the proper amount of reactant for maximum efficiency. The optical chlorine dioxide analyzer is looped in with the supply water flow meter and the process controller to allow for fine exact adjustment of precursor chemicals and real-time display of efficiency.

Embodiments of the disclosed chlorine dioxide generating systems may involve automatic control of the flow of the chemical precursors using electronic flow meters, electronic flow control valves, and a process controller that utilizes the flow meter information to position the control valves. A further component allows for the input of various electronic signals from the plant to add another level of control.

In accordance with one or more embodiments, a process controller may be a combination of a Programmable Logic Controller (PLC) and an interactive Touch Screen Interface. Both devices may be programmed to perform desired functions. The PLC may incorporate a Ladder Logic Program that is used to control various components (flow meters, valves, switches), analyze data (generated or set internally, or input from an external source), monitor alarms status, and provide appropriate outputs. The Touch Screen program may route data to and from the PLC, display outputs from the PLC, and allow control information to be sent to the PLC.

"Eductor motive water flow" is a pressure and flow measurement. With a drop of pressure or flow, the vacuum will be broken causing the generator to shut-down. "Set point deviation" is deviation from the required amount of chlorine dioxide (e.g., the amount of chlorine dioxide per a 24-hour period). "Generator set point" is the set point for the amount of chloride that the generator is scheduled to produce. "Process Variable" or "Production Value" is the actual amount of chlorine dioxide produced relative to the theoretical amount. This can be determined by the sodium chlorite flow-rate. "Efficiency" is measured by a stoichiometric amount. For example, the conversion of sodium chlorite to chlorine dioxide. This can also be a measure of yield or purity. "Real time data" is data produced by the controller on a constant (at all times) basis. The amount of reactant used in the system is measured in terms of pounds per unit time (e.g., pounds/day). The Chlorine Dioxide Generation System may report "Real-time generation efficiency". That is, the system may continuously give a "read-out" of the operating efficiency of the system (e.g., how efficiently the system is producing chlorine dioxide). The controller may be programmed to receive "generator effluent analysis", "eductor water flow rate", "precursor chemical flow rate" and "process variable verification". Programmed into the system may be an inventory of precursor chemicals previously used (e.g., on a monthly basis) to be compared with the current month's usage. If there is a major discrepancy, the system may signal this.

An interactive "Human-Machine-Interface" or HMI may be incorporated that provides the operator with complete details of unit operation. This interface may allow the operator to look at data, monitor conditions and make selections and changes by "touching the screen". The operator does not need an intimate knowledge of the equipment to achieve a desired result. The new design utilizes multiple HD loop control and a user-friendly touch screen interface. A PID (Proportional, Integral, & Derivative) loop may be used as a method for controlling the process. In an exemplary case, the components are an electronic flow meter, a control valve, and a process controller (computer). For example, the flow of sodium chlorite (a chemical used in the production of chlorine dioxide) may be automatically controlled utilizing a magnetic flow meter that provides an analog signal output that is proportional to the actual flow (e.g., the actual amount of sodium chlorite supplied). A flow control valve may receive the analog signal and adjust the valve position based upon initial setup. A Programmable Logic Controller (PLC) may receive and transmit analog signals from the flow meter (rotameter), to the control valve to control the rate of flow to the value internally computed by the PLC (e.g., amount of sodium chlorite).

The PLC may contain the interface connections to the devices in the system that are used for control. A flow meter may provide an analog signal that is in direct proportion to the flow through it. That signal may be input to the PLC and used by the PLC in internal calculations (in the program) to determine whether the measured flow is correct. The PLC may supply an analog output signal to the control valve which opens and closes in proportion to the analog signal sent to it. This process, known as a PID loop, is commonly used to control flow rates. Additional data may also be evaluated in a different fashion. The PLC may monitor the status of a switch (open or closed), and provide a response (alarm, shut down, or other action). The PLC may receive an analog signal from a device and use it to display a tank level condition, or start and stop system components based upon the value of that signal.

Further features incorporated in the design may include all of the normally specified safeties and alarms, but also allow for display of key operating parameters that provide instant information to the operator. Safeties may include devices that transmit a signal to the PLC for processing and comparison to an acceptable range or condition. These conditions are continuously monitored and compared to an acceptable condition as set up in the PLC. Included are flow rates, no flow, low flow, empty tank, gas-in-air, set point deviation, efficiency and others. The number of alarms is limited only by the number of devices in the system. The chlorine dioxide generation system of this invention may be programmed to provide for chemical flow rates, eductor motive water flow rate, generator set point, process variable, chlorine dioxide concentration, efficiency, tank levels, alarm status, etc., along with trending and alarm histories. In addition, real-time data can be accessed to aid in trouble-shooting as well as reporting issues. An example would be the monthly consumption of chemicals involved in the process. All of the data above, along with help and information screens are able to provide guidance.

Real-time generation efficiency can be displayed utilizing continuous generator effluent analysis, eductor water flow rate, precursor chemical flow rates, as well as the process variable. Tuning may occur when the efficiency falls below defined limits and may involve a computed bias to relevant precursor flow rates. The efficient PID loop may provide automatic adjustment of chemical feeds to provide the maximum yield of chlorine dioxide. The PLC may calculate the maximum possible chlorine dioxide theoretically available from the sodium chlorite flow rate. This value may be compared to one calculated from the actual eductor water flow and chlorine dioxide concentration. If the two values differ by more than a preselected amount, for example 5% (this is actually selectable), then a chemical feed adjustment may be made (for example to sodium hypochlorite and hydrochloric acid in the case of a three-chemical system). The process of comparison may continue until the variation is acceptable.

In accordance with one or more embodiments, Analog Signal Representing Plant Flow or Locally Adjusted Set Point and Analog Signal Representing Dosage or Locally Adjusted Dosage Set Point are values used by the process controller to calculate the flow rate required for each of the precursor chemicals. Analog Signal Proportional to Concentration from the Calibrated Chlorine Dioxide Optical Analyzer and Analog Signal Proportional to the Water Flow are values used by the process controller to calculate the process variable using independent process parameters.

An electronic reactant flowmeter may enhance efficiency. For example, the process utilized involves the flow of reactant through a device that provides an output signal that is in direct proportion to the actual gas flow. The efficiency enhancement is due to the improvement in accuracy. The process controller uses PID loop control to accurately supply the proper amount of reactant. Historically, the reactant flow rate was accomplished with a control valve only. The flow of reactant was assumed to be linear with valve position, which it is not; therefore, improved efficiency at all production rates.

In accordance with one or more embodiments, a touch screen may be incorporated into the system to monitor and adjust for real-time conditions. A touch screen may provide an overview of what is happening in the chlorine dioxide generation process. The operator can see the sodium chlorite flow rate, and other relevant parameters such as chlorine dioxide concentration all on one screen. In addition, the operator can observe the trends for set point and process variable on the same display. This is important to quickly observe system stability, both in the set point (from a remote signal) and the corresponding process variable (how much chlorine dioxide actually being produced).

Further, the touch screen interface display may provide immediate access to information and control by "touching" the appropriate location displayed on the screen itself, much as self-service gasoline is often dispensed. The operator "makes a selection" which allows for a specific response or entry to be made. This could involve changing the generator set point, changing the input from local to remote control, setting up initial meter span parameters, and virtually any other operating function required. For example, if the operator sees a "no chlorite" alarm, he can investigate the cause and solve the problem; or another example, if the operator needs to change the dosage, he can go to the dosage screen and make the adjustment by entering the desired dosage.

In some embodiments, a touch screen may be used to monitor an actual chlorine dioxide production rate trend to evaluate system stability and observe changes. A generator set point trend may be used to observe input signal changes. The dosage being applied, i.e. the actual pounds of chlorine dioxide per million pounds of water that it is being applied, may be monitored. The generator set point, i.e. the set point for the amount of chlorine dioxide that the generator is scheduled to produce in pounds per day, may be monitored. The actual chlorine dioxide production rate (process variable) in pounds per day, i.e. the actual amount of chlorine dioxide produced relative to the theoretical, may be monitored. The calculated efficiency measured on a stoichiometric basis, e.g., conversion sodium chlorite to chlorine dioxide, may be monitored. Examples of set points which may be changed using the touch screen include dosage and chlorine dioxide generation set points. The touch screen may also include an alarm reset, for example, after a chemical tank goes empty and is then refilled.

An automatic efficiency control screen may provide setup and monitoring for automatic efficiency control. The operator can set the range of efficiency control desired (usually above 95%) and provide for an alarm feature if the actual efficiency deviates from entered ranges. The operator can also turn the automatic efficiency feature "on", "off" or to "manual". The manual feature allows for the operator to intentionally add excess reactant if a specific need requires it. As with the process control screen, the efficiency set point and process variable are displayed on a trend display for a quick observation of system stability.

An efficiency trend display may have various features. Set Point vs. Process Variable may be employed to observe system stability and changes. Calculated Efficiency may be used to automatically tune the generator. Alarm Type Selection may be used to determine if efficiency control is important or not. If not critical, the alarm may occur but the unit will continue to operate. An alarm may also be used to indicate an optical analyzer failure, such as a lamp failure. OP TEK System Failure/Off Alarm is an alarm indicating the optical analyzer is malfunctioning. Correction Factor and Selection may be used for control of efficiency feature. Some applications may want to manually apply excess reactant. PV over-range and PV under-range may be used as signals to gauge efficiency. For example, if the efficiency set point is 95%, over-range would be >100%; under-range <90% if the alarm is set for ±5%. The primary use for automatic efficiency operation may be to setup the control. For example, when "Auto" is selected, self-tuning may occur. When "(off) reset to 1.0" is selected, the auto efficiency feature may be disabled. When "Manual" is selected, the operator may bias the reactant feed by the amount entered as "Manual Cf."; >1.0=more reactant: <1.0=less reactant.

The systems and methods disclosed herein are widely applicable to all water disinfection and oxidation needs, including industrial, municipal, food, beverage, paper, power and oilfield applications. In one embodiment, disclosed systems and methods may be used in chlorine dioxide applications such as municipal plants or other areas in which chlorine dioxide is needed and a customer wishes to use a chlorite based system capable of high yields and production rates. Municipalities or other users which have replaced chlorine gas with onsite sodium hypochlorite generation systems may generate chlorine dioxide in accordance with one or more embodiments. A utility may already have a sodium hypochlorite generator for use for the distribution system feed of hypochloric acid and may now use or plan to use chlorine dioxide as a pre-oxidant and/or primary disinfectant for raw incoming water. For example, chlorine dioxide may be used for preoxidation and hypochlorite may be used for final disinfection. In accordance with one or more embodiments, an onsite electrolytic sodium hypochlorite generator may be synergistically coupled to a chlorine dioxide generator. An onsite sodium hypochlorite generator may supply sodium hypochlorite for disinfection and also as a reagent for chlorine dioxide generation in integrated systems and processes in accordance with one or more embodiments.

In one non-limiting embodiment, gold ores and slogs may be treated with chlorine dioxide. Sodium hypochlorite or other reactant may be added separately via another independent chemical feed system at a defined dosing/concentration level, so as to increase ORP and to optimize oxidation of the ores natural carbon and sulfidic linkages to more effectively release and solubilize the gold, or other precious recoverable metals. The simultaneous addition of excess sodium hypochlorite or other reactant can be accomplished through the system generator by automatically increasing sodium hypochlorite feed, or the sodium hypochlorite and acid feed, or reducing chlorite feed, if the actual real time sodium hypochlorite concentration that is being fed to the generators reaction column is measured in accordance with the one or more embodiments described herein. The feed rate can then automatically be adjusted via the PLC and optical controller sensor interface.

Example

An existing 500 pounds per day OSEC® sodium hypochlorite generator was used to supply 0.8% sodium hypochlorite as a precursor to produce chlorine dioxide. Sodium chlorite and hydrochloric acid were used at the standard concentrations of 25% and 15% respectively. The chlorine dioxide generator was equipped with magnetic flow meters for sodium hypochlorite and sodium chlorite control and a standard rotameter for acid control. The eductor used was a 184× 325 nozzle and throat assembly that allowed a 9.5 gpm water flow at 100 psi. All meters were calibrated prior to testing. The reaction column used was a standard three-chemical reaction column in a typical 250 pound per day system. An eductor sized for a standard 250 pound per day generator was used.

The USEPA guidance manual recommends that the efficiency of chlorine dioxide generators be calculated based on the species produced from the chlorite ion in the solution which can be either $ClO_2$, $ClO_2^-$, or $ClO_3^-$. Also excess $Cl_2$ must be measured. This approach does not require flow measurements that can introduce up to 5% error in the calculations. This USEPA method is a direct application of the published AIETA method. These procedures as shown in the equations below are applied in this testing program.

Generator Yield is defined as:

$$\% \text{Yield} = ClO_2/(ClO_2^- + ClO_2^- + (67.45/83.45)ClO_3^-) \times 100$$

Where:
$ClO_2$ = chlorine dioxide concentration, mg/l
$ClO_2^-$ = chlorite concentration, mg/l
$ClO_3^-$ = chlorate concentration, mg/l
(67.45/83.45) = Molecular weight ratio of $ClO_2^-$ to $ClO_3^-$ Water plants that use chlorine dioxide should measure excess chlorine as Free Available Chlorine in the generator effluent in addition to the $ClO_2$-related species. FAC may appear as false $ClO_2$ residuals for CT purposes or result in the formation of DBPs if too high.

Under the USEPA guidance manual, excess chlorine is defined as:

$$\% \text{Excess } Cl_2 = Cl_2/(ClO_2 + ClO_2^- + (67.45/83.45ClO_3^-) \times 0.526) \times 100$$

Where:
0.526 is the stoichiometric ratio of chlorine to chlorine dioxide.

% Purity is defined as:

$$\% \text{Purity} = ClO_2/(ClO_2 + ClO_2^- + ClO_3^- + Cl_2) \times 100$$

The generator was operated at nominal rates of 50, 100 and 140 lbs per day. The intent was to operate at 150 lbs/day but flow restrictions in the system as well as eductor flooding limited operation to a maximum rate of about 140 lb/day without significant modifications. Standard Methods 4500-$ClO_2$ Amperometric was used for the determination of $ClO_2$, $ClO_2^-$ and $Cl_2$. Samples for chlorate underwent ion-chromatography analysis.

Results are summarized below in Table 1:

TABLE 1

| Run | $ClO_2$ mg/l. | $Cl_2$ mg/l. | $ClO_2^-$ mg/l. | $ClO_3^-$ total mg/l | $ClO_3^-$ prod. mg/l | % Yield Actual | % Yield | % Excess Chlorine | % Purity |
|---|---|---|---|---|---|---|---|---|---|
| 1 | 688 | 35.5 | 111.3 | 105 | 33 | 83.3 | 77.9 | 8.2 | 73.2 |
| 2 | 664 | 26.9 | 182 | 105 | 33 | 76.1 | 71.3 | 5.9 | 68.0 |
| 3. | 742 | 40.9 | 68.2 | 105 | 28 | 89.0 | 82.7 | 9.3 | 77.7 |
| 4. | 902 | 77.9 | 6.7 | 105 | 31 | 96.8 | 90.7 | 15.7 | 82.7 |
| 5. | 920 | 76.2 | 16.9 | 105 | 33 | 95.8 | 89.8 | 15.1 | 82.3 |
| 6. | 409 | 35.8 | 36.2 | 108 | 60 | 82.7 | 77.0 | 13.8 | 69.4 |
| 7. | 445 | 42.5 | 0.0 | 108 | 63 | 89.7 | 83.8 | 16.3 | 74.9 |
| 8. | 452 | 53.8 | 0.0 | 108 | 65 | 89.7 | 84.0 | 20.3 | 73.6 |
| 9. | 1046 | 81.5 | 0.0 | 114 | 35 | 97.2 | 91.9 | 14.4 | 84.3 |
| 10. | 1062 | 93.9 | 0.0 | 114 | 39 | 97.0 | 92.0 | 16.3 | 83.6 |
| 11. | 1038 | 74.2 | 34.2 | 114 | 38 | 94.0 | 89.2 | 12.7 | 82.4 |

The % purity numbers are influenced by the % Excess Chlorine (FAC) contained within the aqueous chlorine dioxide stream produced. The column "% Yield Actual" represents the yield excluding the chlorate that's added with the precursors—sodium hypochlorite and chlorite. The column "% Yield" represents the effect that chlorate in the precursors would have on efficiency if not subtracted.

Runs 1-3 were set to operate at a nominal rate of 100 pounds per day chlorine dioxide with 5% excess chlorine. The results indicate that actual excess chlorine was between 6-9% with relatively low yields achieved highlighted by the high chlorite residuals. Runs 4 and 5 achieved very good results with about 15% excess chlorine. Runs 6-8 were set to operate at a nominal rate of 50 pounds per day. Run 6 with 7.6% excess chlorine did not produce acceptable conversion of chlorite. Runs 7 and 8 represent very good conversion with about 17-20% excess chlorine. The low chlorine dioxide concentration is a factor in the lower yields at this 50 pounds per day rate. Runs 9-11 were set to operate at a nominal rate of 140 pounds per day. Run 11 at 6.7% excess chlorine was better than at the lower set rates but still did not achieve complete chlorite conversion. Runs 9 and 10 achieved excellent yields at about 15% excess chlorine.

Chlorate analysis was done on Runs 1, 4, 7 and 10 by ion-chromatography representing the three ranges of operation during testing. The chlorate results obtained were used to calculate yields for all runs in each range of operation. The OSEC sodium hypochlorite solution contained 820 mg/l $ClO_3^-$. This represents the significant reason why the chlorate concentration is high in the generator product. The sodium chlorite solution at about 500 mg/l adds insignificant amounts of chlorate at the flow rates used. Because of the large volumes of sodium hypochlorite required, the sodium hypochlorite added between 60-70 mg/l of chlorate to the generator product.

Having now described some illustrative embodiments and examples, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A chlorine dioxide generation system, comprising:
   a reactor column;
   a source of sodium hypochlorite reactant at a concentration of less than about 6% by weight fluidly connected to the reactor column;
   a source of hydrochloric acid reactant fluidly connected to the reactor column;
   a source of sodium chlorite reactant fluidly connected to the reactor column;
   a pH sensor configured to detect a pH condition associated with the reactor column;
   a controller, in communication with the pH sensor, configured to adjust a flow rate of at least one reactant to the reactor column in response to a detected pH condition deviating from a pH range preselected to favor formation of chlorine dioxide in a mixed oxy-chloro product stream;
   a premixing chamber positioned upstream of the reactor column and fluidly connected to the source of hydrochloric acid and the source of sodium hypochlorite, wherein the pH sensor is positioned downstream of the premixing chamber and upstream of the reactor column; and
   a mixed oxy-chloro product stream outlet.

2. The system of claim 1, further comprising a vacuum eductor adapted to facilitate delivery of at least one reactant to the reactor column.

3. The system of claim 1, further comprising a first sensor configured to detect a flow rate of at least one reactant delivered to the reactor column.

4. The system of claim 3, further comprising a second sensor configured to detect a concentration of chlorine dioxide downstream of the mixed oxy-chloro product stream outlet.

5. The system of claim 4, wherein the controller is in communication with the first and second sensors and configured to:
   determine a theoretical chlorine dioxide production rate based on the flow rate of the at least one reactant detected by the first sensor;
   determine an actual chlorine dioxide production rate based on the chlorine dioxide concentration detected by the second sensor;
   monitor a system efficiency based on the theoretical chlorine dioxide production rate and the actual chlorine dioxide production rate; and
   adjust flow of at least one reactant to the reaction column based on the system efficiency.

6. The system of claim 5, wherein a flow rate of at least one reactant is adjusted in response to the system efficiency being deficient with respect to a predetermined limit.

7. The system of claim 1, wherein the controller is configured to regulate flow of the hydrochloric acid to the premixing chamber to establish a pH level within the predetermined pH range.

8. The system of claim 1, further comprising an optical analyzer configured to detect a concentration of sodium hypochlorite reactant introduced to the reactor column.

9. The system of claim 1, having a sodium chlorite molar conversion efficiency of at least about 95%.

10. The system of claim 1, wherein the sodium hypochlorite reactant is at a concentration of about 0.8%.

11. A chlorine dioxide generation system, comprising:
   an electrolytic sodium hypochlorite generator constructed and arranged to produce sodium hypochlorite at a concentration of about 0.2% to about 6% by weight;
   a reactor column having a first inlet in fluid communication with at least one of an outlet of the electrolytic sodium hypochlorite generator, a source of hydrochloric acid, and a source of sodium chlorite;
   a pH sensor configured to detect a pH condition associated with the reactor column; and
   a premixing chamber positioned upstream of the reactor column wherein the pH sensor is positioned downstream of the premixing chamber and upstream of the reactor column.

12. The system of claim 11, further comprising a controller configured to regulate at least one operational parameter of the chlorine dioxide generation system.

13. The system of claim 12, wherein the pH sensor is in communication with the controller.

14. The system of claim 12, further comprising an optical analyzer in communication with the controller configured to monitor a concentration of chlorine dioxide in a product stream exiting the reactor column.

15. A method of producing chlorine dioxide, comprising:
   electrolytically generating sodium hypochlorite at a concentration of about 0.2 to about 6% by weight;
   mixing the electrolytically generated sodium hypochlorite with hydrochloric acid in a first stage to generate a first reaction product;
   introducing the first reaction product to sodium chlorite in a second stage to form a product stream comprising chlorine dioxide and free available chlorine in a desired form; and
   detecting a pH condition of the second stage with a pH sensor positioned between the first and second stages.

16. The method of claim 15, wherein the product stream comprises about 5% to about 21% by weight free available chlorine in the desired form.

17. The method of claim 15, further comprising adjusting a flow rate of at least one reactant based on detecting a deviation from a predetermined efficiency level.

18. The method of claim 15, wherein the desired form of free available chlorine comprises hypochlorous acid.

19. A water disinfection process, comprising:
   providing a source of water to be treated;
   electrolytically generating sodium hypochlorite at a concentration of about 0.2% to about 6% by weight;
   introducing a first portion of the electrolytically generated sodium hypochlorite to the water;
   mixing a second portion of the electrolytically generated sodium hypochlorite with hydrochloric acid in a first stage to generate a first reaction product;
   reacting the first reaction product with sodium chlorite in a second stage to produce chlorine dioxide;
   detecting a pH condition of the second stage with a pH sensor positioned between the first and second stages;
   introducing the chlorine dioxide to the water; and
   collecting a treated water stream.

20. The process of claim 19, further comprising producing free available chlorine in a desired form.

21. A method of facilitating water treatment, comprising:
   providing a chlorine dioxide generator configured to produce chlorine dioxide and free available chlorine in a desired form using a sodium hypochlorite reagent at a concentration of less than about 6% by weight;
   fluidly connecting a sodium hypochlorite inlet of the chlorine dioxide generator to an onsite electrolytic sodium hypochlorite generator configured to generate the sodium hypochlorite reagent at a concentration of less than about 6% by weight;
   providing a pH sensor positioned between a premixing stage of the chlorine dioxide generator and a reaction stage of the chlorine dioxide generator; and
   fluidly connecting an outlet of the chlorine dioxide generator to a water treatment system.

* * * * *